(12) United States Patent
Sørgard et al.

(10) Patent No.: US 8,289,343 B2
(45) Date of Patent: Oct. 16, 2012

(54) METHOD OF AND APPARATUS FOR ENCODING AND DECODING DATA

(75) Inventors: Edvard Sørgard, Trondheim (NO); Borgar Ljosland, Trondheim (NO); Jørn Nystad, Trondheim (NO); Mario Blazevic, Trondheim (NO); Frode Heggelund, Trondheim (NO)

(73) Assignee: ARM Norway AS, Trondheim (NO)

( * ) Notice: Subject to any disclaimer, the term of this patent is extended or adjusted under 35 U.S.C. 154(b) by 0 days.

(21) Appl. No.: 13/314,985

(22) Filed: Dec. 8, 2011

(65) Prior Publication Data

US 2012/0081384 A1 Apr. 5, 2012

Related U.S. Application Data

(63) Continuation of application No. 11/885,442, filed as application No. PCT/GB2006/000769 on Mar. 3, 2006, now Pat. No. 8,102,402.

(30) Foreign Application Priority Data

Mar. 4, 2005 (GB) .................................... 0504570

(51) Int. Cl.
*G09G 5/00* (2006.01)
*G09G 5/02* (2006.01)
*G06K 9/32* (2006.01)
*G06K 9/36* (2006.01)
*G06K 9/40* (2006.01)

(52) U.S. Cl. ........ 345/582; 345/552; 345/587; 345/606; 382/232; 382/235; 382/254; 382/300

(58) Field of Classification Search .................. 345/418, 345/428, 581–587, 589, 586, 618, 643, 522, 345/552, 639, 606–613; 382/165–166, 232, 382/235, 254, 274, 276, 300

See application file for complete search history.

(56) References Cited

U.S. PATENT DOCUMENTS 5,956,431 A 9/1999 Iourcha et al.
(Continued)

FOREIGN PATENT DOCUMENTS

EP 1 400 929 3/2004
(Continued)

OTHER PUBLICATIONS

U.S. Appl. No. 11/885,442, filed Jun. 23, 2008; Inventor: Sorgard et al.
(Continued)

*Primary Examiner* — Wesner Sajous
(74) *Attorney, Agent, or Firm* — Nixon & Vanderhye P.C.

(57) ABSTRACT

An array of texture data elements (texels) is subdivided into a plurality of 8×4 texture element blocks, each of which 8×4 texture element blocks encodes two 4×4 texture element sub-blocks 3, 4. Each encoded texture data block includes data indicating a method to be used to generate a set of color values to be used for the texture elements that the encoded data block represents, and data indicating a method to be used for generating the colors of the individual texture elements using that generated set of colors. As well as the individual texture data blocks, a header data block encoding a base set of colors is generated. This base color set defines a set of colors that is used to generate the colors to be used when reproducing each individual encoded texture data block.

40 Claims, 3 Drawing Sheets

U.S. PATENT DOCUMENTS

| | | | |
|---|---|---|---|
| 6,292,191 | B1 | 9/2001 | Vaswani et al. |
| 6,452,602 | B1 | 9/2002 | Morein |
| 6,593,925 | B1 | 7/2003 | Hakura et al. |
| 6,618,053 | B1 * | 9/2003 | Tanner .................... 345/552 |
| 6,658,146 | B1 | 12/2003 | Iourcha et al. |
| 6,683,978 | B1 | 1/2004 | Iourcha et al. |
| 6,775,417 | B2 | 8/2004 | Hong et al. |
| 6,819,793 | B1 * | 11/2004 | Reshetov et al. .......... 382/166 |
| 7,397,946 | B2 | 7/2008 | Reshetov et al. |
| 2002/0154132 | A1 * | 10/2002 | Dumesny et al. .......... 345/582 |
| 2003/0138152 | A1 | 7/2003 | Fenney |
| 2006/0087505 | A1 * | 4/2006 | Dumesny et al. .......... 345/419 |
| 2007/0018994 | A1 | 1/2007 | Sekine |
| 2008/0055331 | A1 * | 3/2008 | Iourcha et al. ............. 345/582 |

FOREIGN PATENT DOCUMENTS

| | | |
|---|---|---|
| EP | 1 445 734 | 8/2004 |
| JP | 2001-519608 | 10/2001 |
| JP | 2007-026312 | 2/2007 |
| WO | WO 99/18537 | 5/1999 |

OTHER PUBLICATIONS

Office Action mailed Feb. 4, 2011 in co-pending U.S. Appl. No. 11/885,442; Inventor: Sorgard et al.
Translation of Japanese official action, Apr. 5, 2011, in corresponding Japanese Application No. 2007-557593.
Combined Search and Examination Report, May 19, 2006, in Application No. GB 0604343.4.
International Search Report and Written Opinion mailed Sep. 19, 2006 in PCT/GB2006/000769.
English Summary of Japanese official action, mailed Sep. 13, 2011 in Japanese Application No. 2007-557593.
Examination Report mailed Apr. 10, 2008 in corresponding United Kingdom Application No. GB 0718106.8.
Dudgeon et al, "Algorithms for Graphics Texture Mapping," System Theory, 1991, Proceedings, Twenty-third Southeastern Symposium on Columbia, SC, USA Mar. 10-12, 1991, Los Alamitos, CA, USA; IEEE Comput. Soc., US, Mar. 10, 1991, pp. 613-617, XP010024578.
Ivanov et al, "Color Distribution—A New Approach to Texture Compression", Computer Graphics Forum, Amsterdam, vol. 19, No. 3, Aug. 21, 2000, pp. C283-C289, C535, XP009008909.
Drost et al., "A Hybrid System for Real-Time Lossless Image Compression", Microprocessors and Microsystems, IPC Business Press Ltd., London, GB, vol. 25, No. 1, Mar. 15, 2001, pp. 19-31, XP004317581.
Ljosland, "3D and Video in a Single Core", Electronics World, Sep. 2005, vol. 111, No. 1833, Sep. 2005, pp. 34-37, XP008068631.
Chen et al., "A JPEG-Like Texture Compression with Adaptive Quantization for 3D Graphics Application", Visual Computer Springer-Verlag Germany, vol. 18, No. 1, Feb. 2002, pp. 29-40, XP001149442.
Office Action with Combined Search and Examination report dated Oct. 24, 2007, in corresponding United Kingdom Application No. GB0718106.8.
Office Action with Combined Search and Examination Report dated Oct. 25, 2007, in corresponding United Kingdom Application No. GB0718110.0.
FLXTC—Falanx Texture Compression [P0068], Falanx Microsystems, Oct. 29, 2004, pp. 1-12.
FLXTC—Falanx Texture Compression [P0068], Nov. 7, 2007, pp. 1-9.
Khronos Group Membership Agreement Processing Instructions, Khronos Group Membership Agreement Oct. 2007, pp. 1-33.
Fenney, "Texture Compression Using Low-Frequency Signal Modulation", Graphics Hardware, Jul. 2003.
Ström et al., Packman—Texture Compression for Mobile Phones, Ericsson Research, SIGGRAPH, 2004.

* cited by examiner

METHOD OF AND APPARATUS FOR ENCODING AND DECODING DATA

This application is a continuation of U.S. application Ser. No. 11/885,442, filed on Jun. 23, 2008, now U.S. Pat. No. 8,102,402, the entire content of which is hereby incorporated by reference in this application. U.S. application Ser. No. 11/885,442 is the U.S. national phase of International Application No. PCT/GB2006/000769 filed Mar. 3, 2006 which designated the U.S. and claims priority to GB 0504570.3 filed Mar. 4, 2005.

The present invention relates to a method of and apparatus for encoding and decode data, and in particular to such a method and apparatus for use to compress and decompress texture data in computer graphics systems.

It is common in computer graphics systems to generate textures and colours for pixels in the image to be displayed by applying so-called textures or texture data to the surfaces to be drawn. For example, in 3-dimensional (3D) computer graphics, surface detail on objects is commonly added by applying a "texture", such as an image of a piece of fabric, to a set of polygons representing the object, to give the rendered image of the object the appearance of the "texture" (e.g. fabric). Such textures are typically applied by storing an array of texture elements or "texels", each representing a given texture (e.g. colour, luminance, and/or light/shadow, etc.) value, and then mapping the texels onto the corresponding elements, such as (and, indeed, typically) the pixels, in the image to be displayed.

Such arrangements can provide high image quality, but have a number of drawbacks. In particular, the storage of the texture data and accessing it in use can place, e.g., high storage and bandwidth requirements on a graphics processing device (or conversely lead to a loss in performance where such requirements are not met). This is particularly significant for mobile and handheld devices that perform graphics processing, as such devices are inherently limited in their, e.g., storage, bandwidth and power resources and capabilities.

It is known therefore to try to encode such texture data in a "compressed" form so as to try to reduce, e.g., the storage and bandwidth burden that may be imposed on a device.

One known such texture data compression technique determines a set or palette of colours to be used for, e.g., a given scene, and then stores for each texture element (texel) in the scene an index into the set or palette of colours, indicating the colour to be used for that texel. This has the advantage that only an index, rather than a full (e.g.) colour value needs to be stored for each texel. This helps to reduce, e.g., the texture data storage requirements, but still has some drawbacks, such as in terms of reduced image quality and the necessary data processing.

Another known texture compression technique is to use so-called block truncation coding (BTC). In this technique the texture array for a whole scene or image is subdivided into smaller blocks, e.g. of 4×4 texels, and a number (typically two) of base or primary colour values are determined for each such block, with each texel in the block being set to one of the base colour values. This again saves on the data that has to be stored and accessed, but at a cost of lower image quality.

S3 Incorporated of California, USA, have proposed in their U.S. Pat. No. 5,956,431 an improved block truncation coding technique. In this technique, two base colours are again stored for each texel block, but two additional colours to be used for the block are also derived from those two base colours (e.g. by linearly blending those colours). In this way, four colours are provided as a "palette" for the texel block, but only two colour values need to be stored for the block. Each texel in the block is then encoded using two bits, to indicate which of the four block "colours" should be used for the texel. This system provides improved image quality over basic block truncation coding, but requires more data per block.

The Applicants believe that there remains scope for improved data encoding and compression techniques, particularly for use for texture data for graphics processing.

According to a first aspect, there is provided a method of encoding a set of texture data elements to be used for graphics processing, comprising:

encoding the set of texture data elements as a block of texture data; and including in the texture data block:

data indicating how to generate a set of data values to be used for the texture elements that the block represents; and data indicating a method to be used to generate the data value for each texture element that the block represents using the generated set of data values for the block.

According to a second aspect, there is provided an apparatus for encoding a set of texture data elements to be used for graphics processing, comprising:

means for encoding the set of texture data elements as a block of texture data;

means for including in the texture data block data indicating how to generate a set of data values to be used for the texture elements that the block represents; and means for including in the texture data block data indicating a method to be used to generate the data value for each texture element that the block represents using the set of data values generated for the block.

According to a third aspect, there is provided a block of texture data representing a set of texture data elements to be used for graphics processing, comprising:

data indicating how to generate a set of data values to be used for the texture elements that the block represents; and data indicating a method to be used to generate the data value for each texture element that the block represents using the generated set of data values for the block.

In the texture data encoding system, a set of texture data elements is encoded as a block of texture data, like in the known block truncation coding technique. However, each block of texture data includes, inter alia, data indicating how to generate a set of data values for the block in question, and data indicating a method to be used to generate the data value for each texture element represented by the texture data block using the generated set of data values.

As will be explained further below, the Applicants have found that this form of encoding facilitate good reproduced image quality, whilst still permitting relatively and sufficiently high data compression rates. Encoding the texture data in this way allows, for example, the data values, such as the colour values, to be used when reproducing the image from the encoded data to be modulated and varied on a block-by-block basis. This provides greater flexibility in the data values, e.g., colours, that may be reproduced, even if only a limited overall set or palette of data values (e.g. colours) is provided (e.g. to facilitate data compression).

The technology described in this application can be used to encode any suitable form of texture data. As discussed above, such data, in its original, raw or unencoded form, is typically arranged in the form of arrays of texture elements or texels, and thus in a particularly preferred embodiment, the technology described in this application is used to encode an array of texture data elements (texels). Such arrays are typically, as is known in the art, 2-dimensional, although it would also be possible to use the technology described in this application to encode a 3-dimensional array (or indeed to encode data that is not in the form of a regular array (provided, e.g., that the encoding and decoding processes are arranged so as to be able to reproduce the data in the correct order and/or positions)).

The texture data elements can represent any suitable texture data, such as, for example, colours, luminances, bump-maps, shadow-maps (light-maps), etc., as is known in the art. In a particularly preferred embodiment, the texture data elements each represent a colour value for a texture element, but this is not essential.

As will be appreciated by those skilled in the art, the actual data values accorded to the texture elements, both in their original, unencoded raw form, and in their encoded form (or at least when the encoded data has been decoded to reproduce a representation of the original data) will depend on the form of "texture" that the texture elements are intended to define or represent.

Thus, for example, where the texture elements define colours to be used, the texture data elements in their original, unencoded from will each comprise a set of colour values (Red, Green, Blue (RGB), or a set of colour and transparency values (Red, Green, Blue, Alpha (RGBa)), and the encoded data, when decoded (reproduced), will generate a corresponding set of colour values.

In the case of shadow (light)-maps, for example, the texture data elements, will each comprise or represent a set of data values indicating, e.g., whether the texture element is in light or in shadow, and the amount (and/or colour) of the light or shadow for that texture element. Similarly, for a normal-map (bump-map), the data for each texture element will be a set of values indicating the direction in which light will be reflected at that texture element.

The texture data elements could also, e.g., represent z values (depth values), stencil values, luminance values (luminance textures), luminance-alpha-textures, and/or gloss-maps (i.e. whether a surface is shiny at the texture element position or not), etc.

It would be possible, where appropriate for each texture data block to only encode data necessary to generate some, but not all, of the data values necessary to reproduce the original data, with the remaining data values being derived (e.g. therefrom) as part of the data reproduction process. Thus, in a preferred embodiment, the encoded texture data block encodes data representative of some of the original texture data, with data representative of other parts of the original data being derived from the encoded data during the decoding process.

For example, in the case of normal-maps, it would be possible for the encoded texture data to, e.g., only encode two of the normal direction components (e.g. dx and dy), with the third component (dz) being derived from these two values when the data is decoded (since it is known that the sum of the squares of the components must be 1 (as they define a normal vector of length 1): $1=dx^2+dy^2+dz^2$).

The actual data values that each texture element encodes and represents, and, accordingly, the data values that are generated as the set of data values for a texture data block, and that are reproduced for each encoded texture element, will accordingly depend on the texture data that the encoded texture elements represents.

Thus, for example, in the case of colour data, each data value will, e.g. comprise or represent a set of colour values (i.e. RGB or RGBa values), i.e. such that a set of "colours" will be generated for the texture data block and a colour (i.e. a set of RGB or RGBa values) will be generated for each decoded texture element. In the case of a luminance texture, the data values will represent luminance values, i.e. such that a set of luminance values will be generated for the texture data block and a luminance value will be generated for each decoded texture element. For a normal-map, each data value will correspond to a normal vector (i.e. vector components dx, dy, dz) and thus a set of normal vectors will be generated for the texture data block, and a normal vector (i.e. a set of vector components; dx, dy, dz) will be generated for each decoded texture element, and so on.

It should be noted here that references herein to "colours" or "luminances", etc., accordingly refer to, as will be appreciated by those skilled in the art, a set of data values that allow the colour or luminance, etc., in question to be reproduced, e.g., on a display. These data values may comprise any suitable set of colour or luminance, etc., data, such as a set of RGBa values as discussed above. Equally, references to generating a set of data values for an encoded texture data block, and to data values for individual texture elements, encompass data values that each comprise or include a combination of values, such as a set of colour values (RGB or RGBa), as appropriate.

The set or array of texture data elements that is encoded can be any suitable or desired such set. For example, the encoded texture data block could, if desired, represent the entire scene or image (or texture map) to be reproduced.

However, in a particularly preferred but still example embodiment, each texture data block encodes a smaller portion (or block) of the scene or image or texture map in question, as in traditional block encoding techniques. In such a case, the texture data block will encode and represent a selected set or array of the original texture data elements, such as a 4×4 array of texels.

It will be appreciated that in such an arrangement, a plurality of such individual texture data blocks will be needed to encode the overall set of original texture data (texture data elements). Thus, in a particularly preferred embodiment, the technology described in this application further includes sub-dividing a set of texture data elements (e.g. for a scene) into a plurality of sub-sets of texture data elements, and then encoding each sub-set of texture data elements as a texture data block. In such an arrangement, it is preferred for each sub-set to represent the same number (and, e.g., array) of texture data elements, and for each texture data block to have the same size, i.e. for a fixed rate encoding scheme to be used. This facilitates the encoding and decoding processes, as is known in the art. Thus, for example, a scene could be divided into a plurality of 4×4 texel arrays, with each such array being encoded as a separate texture data block.

It is also accordingly preferred, where a plurality of texture data blocks are to be encoded, for the individual blocks to have a common format, e.g. in terms of their data (bit position) order, etc., within the block, as that again facilitates the encoding and decoding processes.

Where plural texture data blocks are used to encode a larger scene or image (or set or array of texture elements) (or part thereof), the actual subdividing of the scene or image into smaller blocks, and the order of encoding into texture blocks can be selected as desired. In an example embodiment the blocks (sub-sets of data) are encoded in Morton order, although other arrangements, would, of course, be possible.

In an example embodiment, the set of texture elements encoded as a single block of texture data is further sub-divided within the texture data block, e.g. into texture data "sub-blocks". For example, a texture data block could be used to encode an 8×4 array of texture elements, but the encoding would be such that the array of texture elements is effectively encoded as two 4×4 texture element sub-blocks within the texture data block. Indeed, it is a preferred example embodiment for each texture data block to encode (represent) two 4×4 texture element arrays (i.e. 8×4 texture elements) from the original set of texture elements (e.g. scene or image).

In such an embodiment, the sub-blocks of the texture data block share the same data indicating how to generate a set of data values (e.g., colours) for the block, and the method to be used to generate the data values (e.g. colours) for the texture elements, but are reproduced separately (i.e. the data values (e.g. colours) for the texture elements represented by the texture data block are generated (when the block is decoded) on a sub-block-by-sub-block basis, rather than across the block as a whole).

These arrangements have the advantage that the "sub-blocks" within the texture data blocks can effectively share some of the block information, thereby facilitating higher data compression rates, but without the need to decode a larger array of texture elements as a whole.

It is believed that such arrangements may be new and advantageous in their own right. Thus, according to a fourth aspect, there is provided a method of encoding a set of texture data elements to be used for graphics processing, comprising:

dividing the set of texture data elements into a plurality of sub-sets of such elements; and encoding two or more of the sub-sets of texture data elements as a single texture data block in which each sub-set of texture data elements is to be reproduced independently of the other sub-sets of texture data elements.

According to a fifth aspect, there is provided an apparatus for encoding a set of texture data elements to be used for graphics processing, comprising:

means for dividing the set of texture data elements into a plurality of sub-sets of such elements; and means for encoding two or more of the sub-sets of texture data elements as a single texture data block in which each sub-set of texture data elements is to be reproduced independently of the other sub-sets of texture data elements.

According to a sixth aspect, there is provided a block of encoded texture data representing a set of texture data elements to be used for graphics processing, comprising:

data representing two or more sub-sets of the set of texture data elements that are to be reproduced independently of each other.

These example aspects and embodiments can, as will be appreciated by those skilled in the art, include any one or more or all of the features described herein. Thus, it may be for example, preferred for the texture data block to encode two (and only two) sub-sets of texture data elements. Similarly, the encoded texture data block preferably includes a common, single set of data indicating how to generate a set of data values (e.g. colours) to be used for the block and the method to be used to generate the data value for the texture elements of the block, which data is shared for the subsets of texture data elements of the block (i.e. such that the same such data is used for each sub-set of texture data elements encoded by the block).

The data that is included in the encoded texture data block for indicating how to generate the set of data values (e.g. colours) to be used for the texture element that the block represents can be any suitable such data. For example, it could indicate a calculation or algorithm that is to be used to generate the data values.

In an example embodiment, this data indicates how the set of data values is to be generated from a base or primary set or table (palette) of data values. This helps to facilitate compression of the texture data, since, for example, the base or primary set of data values may be (and indeed, preferably is) a reduced set of data values representing the data values in the original unencoded set of texture data, and/or, for example, may be shared by plural individual texture data blocks. For example, in the case of colour textures, the base or primary set of data values could comprise a reduced set (palette) of colours (set of colour values) representing the colours used in the original image or texture map.

In this arrangement, the base set of data values to be used can be generated as desired, for example, by, as is known in the art, assessing the data values present in the original texture data (i.e. the data which is to be encoded and compressed) and deriving therefrom a set of data values that are representative of and/or can be used to derive, the original data values. Preferably, a reduced set of data values (i.e. that includes less data values than the original data, e.g. that is a sub-set of the set of data values used in the original data) is derived and used for the base set of data values, as that facilitates compression of the original data. Any suitable technique can be used for this, such as, for example, using error comparison techniques to determine the reduced set of data values that best matches the original set of data values. This will provide, in effect, a predefined or predetermined, base set of data values to be used for the texture data block or blocks.

The base set of data values could be determined, e.g., on a block-by-block basis. For example, in the case of colour data, as in conventional block truncation encoding techniques, one or two (or more) base representative colours could be determined for a texture block, which colours would then serve as the base colour palette to be used when generating the set of colours to be used when reproducing the texture block. In this case, the base data values in the data value palette for the block could, e.g., be provided as part of the data for the texture block (i.e. be included in the texture data block itself), as in conventional techniques.

However, in an example embodiment, a single base set of data values (e.g. palette of colours) is determined and used for a plurality of texture blocks in common (i.e. such that plural texture blocks share and use the same base set of data values). Preferably, a base set of data values (e.g. colours) is determined for the entire texture (e.g. texture map) to be imaged. This will, in effect, determine a "global" base set of data values (e.g. colour palette) to be shared by the texture blocks (e.g. for the scene), from which the data value (e.g. colours) for the individual texture blocks can then be generated (and, e.g., changed or modulated on a block-by-block basis).

Using a "shared" base set of data values for plural texture data blocks (e.g. an entire scene) has the advantage that each individual block can be allowed to select from a greater range of data values for generating its own set of data values (thereby, e.g., providing greater data value flexibility and image quality), whilst still achieving relatively high texture compression rates. It also, e.g., in the case of colours, facilitates the use of alpha (transparency) gradients, as using a "global" colour palette facilitates the use, e.g., of more complex alpha values.

Where such a "global" or shared palette of data values (e.g. colours) is used, the number of data values in the palette can be selected as desired. Preferably between 1 and 128 data values are used, most preferably 32-64 data values. In a particularly preferred embodiment, particularly where the entire scene shares a single base set of data values, 64 data values (e.g. colours) are used, although other arrangements such as 32, 16, 8 or 4, etc., data values would be possible.

It should be noted here that an important advantage of the technology described in this application is that it facilitates the storing of such base data values (e.g. colours) at a lower precision (e.g. than the original image), whilst still achieving relatively and sufficiently high reproduced image quality. The Applicants have found, for example, that storing 64 base colours with 16 bit accuracy (RGB565 or RGBA4444) will still provide very good image reconstruction. Therefore the technology described in this application in fact facilitates the use of a "global" or shared base data value palette containing a relatively high number of data value entries, and accordingly the enhanced image quality that can provide.

Thus, in an example embodiment, the base data values (e.g. colours) are encoded at a lower precision than in the original data. This again facilitates compression of the original data.

Where a base set of data values (e.g. colours) to be shared by plural individual texture data blocks is used, then that base set of data values is preferably encoded and provided separately to the individual texture data blocks (rather than, e.g., being included in each individual texture data block). This base set of data values could, e.g., be encoded and provided (and, indeed, is preferably provided) as a separate data block that is, e.g., associated with the set of texture data blocks that will share it. Thus it could, e.g., be provided as a header (or footer) data block to a stream of texture data blocks that will share it.

It is believed that such arrangements may be new and advantageous in their own right. Thus, according to a seventh aspect, there is provided a method of encoding texture data to be used for graphics processing, comprising:

determining a set of data values that is representative of the texture data and encoding that set of data values as a data block;

dividing the texture data into a plurality of blocks; and encoding each texture data block as a data block and including in each such data block, data indicating a data value or values from the data values block to be used for the texture data block in question.

According to an eighth aspect, there is provided an apparatus for encoding texture data to be used for graphics processing, comprising:

means for determining a set of data values that is representative of the texture data and encoding that set of data values as a data block;

means for dividing the texture data into a plurality of blocks; and means for encoding each texture data block as a data block and including in each such data block, data indicating a data value or values from the data values block to be used for the texture data block in question.

According to a ninth aspect, there is provided a set of encoded texture data encoding texture data to be used for graphics processing, comprising:

a data block that encodes a set of data values to be used for the set of encoded texture data; and a plurality of data blocks, each encoding a sub-set of the set of texture data, and each including data indicating a data value or values from the data values block to be used for the texture data sub-set in question.

Again, as will be appreciated by those skilled in the art, the above embodiments and aspects may include any one or more or all of the features described herein, as appropriate. Thus, for example, each texture data block preferably encodes two (and only two) sub-blocks of texture data that are to be reproduced separately. In this arrangement there would then, in effect, be three levels of encoded texture data, namely "global" data in the form of the block of base data values, semi-local data in the form of the shared data in each texture data block, and local data in the form of the data for each individual sub-block in the texture data blocks.

According to a tenth aspect, there is provided a method of encoding texture data to be used for graphics processing, comprising:

dividing the texture data into a plurality of sub-sets of texture data;

encoding the texture data as a plurality of texture data blocks, each texture data block encoding two or more of the sub-sets of the texture data and including data specific to each sub-set of texture data and data to be shared by the sub-sets of texture data encoded by the texture data block; and encoding a data block comprising data to be shared by the texture data blocks.

According to an eleventh aspect, there is provided an apparatus for encoding texture data to be used for graphics processing, comprising:

means for dividing the texture data into a plurality of sub-sets of texture data;

means for encoding the texture data as a plurality of texture data blocks, each texture data block encoding two or more of the sub-sets of the texture data and including data specific to each sub-set of texture data and data to be shared by the sub-sets of texture data encoded by the texture data block; and means for encoding a data block comprising data to be shared by the texture data blocks.

According to a twelfth aspect, there is provided a set of encoded texture data to be used for graphics processing, comprising:

a plurality of texture data blocks, each texture data block encoding two or more sub-sets of the texture data and including data specific to each sub-set of the texture data and data to be shared by the sub-sets of texture data encoded by the texture data block; and a data block comprising data to be shared by the texture data blocks.

These aspects and embodiments can again include any one or more or all of the features described herein.

In an example arrangement, the data that is shared by the sub-sets of texture data represents or defines (or allows one to generate) indexes to, e.g., sets of data values (e.g. colours) that are to be used for the texture data sub-set (sub-block). The data that is specific to a given sub-set can similarly define indexes to data values, or it could also or instead define other information, such as how data values are to be interpolated or derived from other data values for texture elements of the sub-set.

Where the data values to be used for a texture data block are to be generated from a base set of data values (whether defined on a block-by-block, or more global basis), then the data indicating how to generate the set of data values to be used included in the texture data block can indicate how the data values in the base set of data values are to be used to generate the set of data values to be used for the block in any suitable or desired manner.

Thus this data could, e.g., and indeed, preferably does, indicate that the set of data values for the block is to comprise a data value or values taken directly from the base set of data values, and/or should comprise a data value or values derived or interpolated from a data value or values in the base set of data values, or a combination of such data values. Where a data value is to be derived from the base set of data values, then this could be done, e.g., by blending a data value or values taken from the base set of data values, and/or by adjusting a data value or values taken from the base set of data values, and/or by a combination of these techniques. In a preferred embodiment, the data indicating how to generate the set of data values for the block can indicate any one of these alternatives.

In an example embodiment, the data indicating how to generate the set of data values to be used for the texture data block indicates which of a plurality of selected, preferably predetermined, data value set generation techniques or methods is to be used for the block. This has the advantage that the data included in the texture data block for this purpose need simply indicate which data value set generation method is to be used, i.e. in effect act as an index to the data value set generation method to be used, rather than, e.g., the texture data block having to include data describing more comprehensively how the set of data values is to be generated.

In such an arrangement, the predetermined data value set generation methods preferably include one or more or all of the methods described above. Thus, they preferably include the set of data values for the block comprising a data values or values taken directly from a defined base set of data values, and/or a data value or data values generated by blending a data value or values taken from a base set of data values, and/or a data value or values generated by adjusting a data value or values taken from a base set of data values, and/or a combination of these techniques. Most preferably the predefined data value generation methods that a texture data block can "select" from comprise at least one mode in which the data values are taken directly from a base set of data values, and another mode in which the data values comprise both a data value or values taken directly from a base set of data values, and a data value or values that are derived from (e.g. by blending and/or adjusting) a data value or values taken from a base set of data values.

In an example embodiment, there are four predefined (predetermined) data value generation methods. Preferably, one of these methods uses data values directly from a base set of data values, and the other three use at least some derived (preferably blended or adjusted) data values based on the base set of data values. Preferably, the latter three data value generation methods use some blended data values and also some adjusted data values. This arrangement has the advantage that the data value generation data included in the texture data block can comprise a 2-bit index (indicating which of the four data value set generation methods is to be used), thereby requiring relatively little data capacity, but still allowing relatively high reproduced image quality to be achieved.

Where a data value to be used in the set of data values for a texture data block is to be formed by blending a data value or values taken from a base set of data values, then such blending can be carried out in any desired and appropriate fashion. For example, a simple linear blend (e.g. 50:50, $\alpha:\beta$, or $\delta:\epsilon$ (and vice-versa)) of two data values could be used. The data values to be blended could, e.g., include or all comprise a data value or values taken directly from the base set of data values, a data value or values otherwise generated for the block (e.g. a blended or adjusted data value that has already been generated for the block), and/or a combination thereof. Thus, for example, the blended data value could comprise a blend of a data value taken directly from a base set of data values together with another blended or adjusted data value that has been generated for the texture block in question.

Where blended data values are to be used, the data indicating how to generate the set of data values for the texture data block preferably indicates how any blended data values are to be generated. Where predefined data value generation methods as discussed above are used, the blending mode or modes can be and preferably is predefined as part of the data value generation method.

Where a data value to be used in the set of data values for a texture data block is to be generated by adjusting a data value, such adjustment preferably comprises modifying the data value or values (e.g. in the case of colours, a set of RGB or RGBa values) for the data value to be adjusted in a particular, preferably predetermined, manner. For example, selected values could be added (or subtracted) to the set of data values of the data value to be adjusted to give the adjusted data value (set). The data value to be adjusted could, e.g. be taken directly from a base set of data values, or, e.g., be a blended or adjusted data value that is or has been generated for the texture data block.

Again, where "adjusted" data values are to be used, the data indicating how to generate the set of data values for the texture block preferably indicates how any such "adjusted" data values are to be generated. Where predefined data value generation methods are used, the "adjustment" to be made can be and preferably is again predefined as part of the data value generation method.

The set of data values that is generated for a given texture block can comprise any desired and suitable number of data values. It should again comprise and preferably does comprise a limited or reduced set of data values (as compared, e.g., to the set of data values used in the original data). Thus, for example, the set of data values generated for the texture data block preferably comprises less data values than, such as a sub-set of, the original data values and/or the data values in the base set of data values (where provided). This again facilitates compression of the original data.

Preferably between 1 and 8, most preferably 2-4, data values are included in the set of data values generated for a texture data block. In a particularly preferred embodiment, four data values are generated. The Applicants have found that generating a set of four data values for a given texture block can provide a sufficiently high reproduced image quality, but without overburdening the data storage and processing resources of a device. The same number of data values is preferably generated for each texture data block.

As discussed above, the actual data values (e.g. in terms of their format and what they represent) that are generated for the set of data values to be used for a texture data block and, where appropriate, that are used for the base set of data values, will depend on the nature of the texture data that is being encoded. For example, as discussed above, in the case of colour data and colour maps, each data value will represent a given colour, and, e.g., comprise a set of colour values, such as RGB or RGBa values. On the other hand, for a luminance map, each data value may comprise and represent a single luminance value. For normal-maps (bump maps), each data value will comprise a set of components representing a normal vector, and for shadow (light) maps, each data value will comprise and represent a set of values indicating, e.g., the presence or absence, and amount of, light or shadow, and so on.

The data that is included in the encoded texture data block for indicating the method to be used to generate the data value (e.g. colour) for each texture element encoded for the block using the set of data values generated for the block can similarly be any suitable such data. For example, it could indicate a calculation or algorithm to be used to generate the data values.

In an example embodiment, this data indicates whether the data value (e.g. colour) to be used for each texture element is to be taken directly from the set of data values (e.g. colours) generated for the texture data block, or is to be interpolated or derived in some way from those data values.

In the case of colours, for example (i.e. where the encoded texture data represents a colour for each texture element), an arrangement in which the colours (data values) are taken directly from the set of colours generated for the texture data block has been found to provide better image reproduction for texture data that has many different colours and high frequency, such as is typically found in artificial drawings. On the other hand, an arrangement in which the texture elements' colours are interpolated from a set of colours generated for the texture data block has been found to provide better image reproduction for texture data that has many similar colours and lower frequency, such as is typically found in photo-realistic textures.

Where the data value for a given texture element is to be interpolated or derived in some way from the set of data values generated from the texture data block, then that could, e.g., be done by blending or adjusting one or more of those data values, e.g. in a similar manner to that discussed above for generating the set of data values for a texture data block from a base set of data values.

However, in an example arrangement, the data values to use for the texture elements are generated by interpolating those data values along a path or paths that covers a number of the texture elements that the block represents. Preferably, a texture element path that covers a plurality of texture elements is defined, together with its endpoint data values (e.g. colours), and then the data values (e.g. colours) of the texture elements intermediate the endpoints of the path are determined by interpolating in an appropriate or selected manner between the endpoint data values for the position of the texture element in question. For example, a straight line texture element path covering a row of four texture elements could be defined, with the end texture elements having their data values set to data values taken directly from the set of data values generated for the texture data block, and the two middle texture elements having their data values interpolated from the two end point data values (e.g. by simple linear interpolation).

Such an arrangement applies, in effect, a fading path or scheme to the texture elements, and has been found by the Applicants to provide, in the case of colour data at least, particularly good colour reproduction for photo-realistic textures.

It is accordingly believed that such an arrangement may be new and advantageous in its own right. Thus according to a thirteenth aspect, there is provided a method of encoding a set of texture data elements to be used for graphics processing, comprising:

encoding the set of texture data elements as a texture data block; and including in the texture data block, data indicating a path or paths that covers a number of the texture elements that the texture data block encodes and over which the data values for the texture elements are to be interpolated.

According to a fourteenth aspect, there is provided an apparatus for encoding a set of texture data elements to be used for graphics processing, comprising:

means for encoding the set of texture data elements as a texture data block; and means for including in the texture data block, data indicating a path or paths that covers a number of the texture elements that the texture data block encodes and over which the data values for the texture elements are to be interpolated.

According to a fifteenth aspect, there is provided a texture data block encoding a set of texture data elements to be used for graphics processing, comprising:

data indicating a path or paths that covers a number of the texture elements that the texture data block encodes and over which the data values for the texture elements are to be interpolated.

These aspects and embodiments can again include any one or more or all of the features discussed herein. Thus, for example, the data indicating a path that covers a number of texture elements preferably defines or indicates a path that covers a plurality of texture elements, and the endpoint data values for the path, and, optionally, the interpolation scheme to be used along the path.

Where such an interpolation arrangement is to be used, then the encoded texture data block preferably indicates the texture elements that the interpolation path or paths to be used covers. This is preferably done by indicating the endpoints of the interpolation path and the path to be followed between these endpoints (e.g. whether it is a straight line or zig-zag, etc.).

The way that the data values for the texture elements covered by the interpolation path or paths are to be determined is preferably also indicated. In an example embodiment, this is done by taking the endpoint data values directly from the set of data values generated for the texture data block, with the data values for the intermediate texture elements being, preferably linearly, interpolated from those data values. However, other, e.g., more complex, arrangements would be possible if desired. Preferably, the arrangement is such that for a given interpolation path, half the texture elements have their data values selected directly from the set of data values generated for the texture data block, and the other half have their data values interpolated from those selected data values.

Thus, in an example embodiment, the data value (e.g. colour) for a or more than one texture element that the texture data block encodes is based on the position of the texture element along a path covering a plurality of the texture elements, and, e.g., specified endpoint data values (e.g. colours) for the path. In this case, the data value for a given texture element would be determined by determining the endpoint data values for the path, determining the position of the texture element along the path, and then interpolating or deriving the data value for the texture element accordingly.

The number of texture elements that an interpolation path covers can be selected as desired, and should, e.g., be based on the number of texture elements that each texture data block encodes. In a preferred embodiment, each interpolation path covers four texture elements of the block (e.g., such that, preferably, for the four texture elements, two will be endpoints of the interpolation path and have their data values taken directly from the set of data values generated for the texture data block, and two will be "intermediate" elements that will accordingly have their data values interpolated from the endpoint data values).

In an example embodiment, a set or sets of interpolation paths for application to the texture data elements (or a sub-set of the texture data elements) of a texture data block may be and preferably is defined. This could comprise, e.g., defining a set of related interpolation paths that together cover all or a sub-set of the texture data elements that a given texture data block represents. For example, for a 4×4 texture element block, a set of four interpolation paths, each covering one row of four texture elements in the block, could be defined as a set of interpolation paths to be applied to the block. This in effect defines a fading or shading pattern to be applied to the texture elements that the texture data block represents (encodes).

Thus, in an example embodiment, the data indicating the method to be used to generate the data values for the texture elements of the block indicates a particular fading pattern to be used for the block, which fading pattern defines a set of interpolation paths to be applied to texture elements that the block represents. In such an arrangement, each interpolation path preferably covers the same number of texture elements (e.g. 4). It is also preferred in such arrangements, for half the texture elements covered by the fading pattern to take their data values directly from the set of data values generated for the texture data block, and for the remaining texture elements to have their data values interpolated from those data values.

In an example embodiment, a plurality of interpolation schemes and of fading patterns may be used, and are, e.g., predefined, with the data indicating how to generate the data values for each texture element in the block then, e.g., indicating which such predefined or predetermined fading pattern and/or interpolation scheme is to be used. Each such, e.g., fading pattern could use (and indeed, preferably does use) different or a different set of interpolation (fading) paths. In a preferred embodiment, eight fading patterns, each having a different combination of interpolation paths are used. This has been found, in the case of colour data at least, to facilitate particularly good reproduction of, e.g., photo-realistic images.

Where plural interpolation schemes and/or fading patterns are used, each fading pattern, etc., preferably covers the same number of texture elements, and uses the same data value interpolation process (i.e. such that the fading patterns, e.g., will differ only in terms of their fading direction and paths). This helps to simplify the encoding and decoding process.

Where a fading pattern (or interpolation scheme) is used, then the fading pattern (or interpolation scheme) could cover all of the texture elements that the texture data block represents, or, e.g., only a sub-set of those elements. Where, as discussed above, the texture data block encodes sub-sets of texture data elements that are to be reproduced independently, then the fading pattern(s) (or interpolation scheme) preferably covers a single sub-set of the texture elements, i.e. such that a fading pattern (or interpolation scheme) will need to be applied to each sub-set of texture elements independently.

Preferably in such an arrangement, the encoded texture data block can indicate that a different fading pattern (or interpolation scheme) is to be applied to each sub-set of texture elements. This would allow, e.g., a different fading pattern to be applied to different sub-blocks of a texture data block. Thus, for example, where a texture data block encodes an 8×4 array of texels as two 4×4 sub-blocks, it is preferred for it to be possible to apply different fading patterns to each of the two 4×4 sub-blocks.

In an example embodiment, the data indicating the method to be used to generate the data values for the texture elements of the texture data block indicates which of a plurality of selected, preferably predetermined, data value generation methods is to be used for the block. This has the advantage that the data included in the texture data block for this purpose need simply indicate which data value generation method is to be used, i.e. in effect act as an index to the data value generation method to be used, rather than, e.g., the texture data block having to include data describing more comprehensively how the data values are to be generated.

In such an arrangement, the predetermined data value generation methods preferably include one or more or all of the methods described above. Thus, they preferably include the data values for the texture elements of the block being taken directly from the set of data values generated for the block, and/or the data values for the texture elements being derived or interpolated from the set of data values that is generated for the block (e.g., preferably, that a fading pattern is to be applied to the block), and/or a combination of these techniques. Most preferably the predefined data value generation methods that a texture data block can "select" from comprise at least one method in which the texture elements' data values are taken directly from the set of data values generated for the block, and another method in which the texture elements' data values comprise both a data value or values taken directly from the generated set of data values, and a data value or values that are derived from the generated set of data values (such as, e.g., the application of a fading pattern as discussed above).

In an example embodiment, there are two basic predefined (predetermined) data value generation methods. Preferably, one of these methods uses data values directly from the set of colours generated for the texture data block, and the other uses at least some data values that are derived from the set of data values generated for the block. In an example embodiment, the method that uses derived data values uses or can use one or more (and preferably plural, most preferably eight) predefined fading patterns of the type discussed above, with the texture data block including data indicating which such fading pattern is to be used.

As discussed above, the actual data values (e.g. in terms of their format and what they represent) that are generated for each texture element will again depend on the nature of the texture data that is being encoded. Thus, for example, as discussed above, in the case of colour data and colour maps, each data value will represent a given colour, and, e.g., comprise a set of colour values, such as RGB or RGBa values. On the other hand, for a luminance map, each data value may comprise and represent a single luminance value. For normal-maps (bump maps), each data value will comprise a set of components representing a normal vector, and for shadow maps (light maps), each data value will comprise and represent a set of values indicating, e.g., the presence or absence, and amount of, light or shadow, and so on.

In an example embodiment, both the data indicating how to generate a set of data values to be used for the texture elements encoded by the texture data block, and the data indicating the method to be used to generate the data values for each texture element, indicate a predefined data value set generation mode and data value generation method, respectively, that is to be used for the texture data block.

In an example arrangement, one or more predefined data value set generation modes (i.e. for generating the set of data values to be used for the block) are associated with one or more predefined data value generation methods (i.e. for generating the data values of the texture elements from the set of data values generated for the block), and the encoded texture data block includes data indicating which combination of data value set generation mode and texture element data value generation method is to be used. Preferably, four combinations of data value set generation mode and texture element data value generation method are predefined. This allows the combination to be used to be indicated using a two-bit index in the encoded texture data block.

In such an arrangement, the combinations of data value set generation mode, and texture element data value generation method can be selected as desired. In a preferred embodiment, the data value set generation modes include, as discussed above, a mode in which the data values to be used for the block are taken directly from a base data value set, and a mode or modes in which the data values are derived from the base data value set. Similarly, the texture element data value generation methods preferably include a method in which the data values are taken directly from the set of data values generated from the block, and a method or methods in which data values are interpolated or derived from the set of data values generated for the texture block.

In an example embodiment, one of the predefined combinations of data value set generation mode and texture element data value generation method that can be selected comprises a data value set generation method in which the data values are taken directly from a base set of data values and a texture element data value generation method in which the data values are taken directly from the set of data values generated for the block, and another of the predefined combinations that can be selected (and, preferably, all of the remaining predefined combinations) comprises a data value set generation method in which one or more of the data values are derived from a base set of data values, and a texture element data value generation method in which at least some of the data values are derived or interpolated from the set of data values generated for the block.

As will be appreciated by those skilled in the art, as well as the above-discussed data setting out how to generate a set of data values for the texture data block, and the method to be used to generate the data values for the individual texture elements, it may also be (and indeed typically will be) necessary to include other data in the encoded texture data, for example to indicate exactly how the data value for an individual texture element is to be generated using the set of data values generated for the block and the method for texture element data value generation defined for the block. For example, where, as discussed above, a two-bit index is used to indicate the data value set generation mode and texture element data value generation method, further information may need to be provided to allow the actual data value for a given texture element to be derived.

Thus, in an example embodiment, the encoding method and apparatus further includes a step of or means for including in the texture data block, data for allowing the data value for each individual texture element that the block encodes to be generated using the generated set of data values for the block and the texture element data value generation method defined for the block.

The exact nature of this data will vary, for example, depending on the method that is to be used to generate the data values for the texture elements from the set of data values generated for the block. For example, where the data values of the individual texture elements are to be taken directly from the set of data values generated for the block, then this data could, e.g., comprise data indicating which such data value is to be used for each texture element (which data could, e.g., (and indeed, preferably does) comprise an index, or at least allow an index to be derived, for each texture element, into the set of data values generated for the texture data block). On the other hand, where, e.g., a fading pattern is to be used to derive the data values for the texture elements encoded by the block, it may, e.g., be necessary also, or instead, to include data indicating the exact fading pattern, and, e.g., fading direction, to be used (for example, where the data indicating the method to be used to generate the data values simply specifies that a fading pattern is to be used, but does not otherwise specify the fading pattern details).

In an example embodiment, this data at least indicates a data value from the generated set of data values to be used for a texture element that the block represents. Preferably, the data values to be used for a number of the texture elements that the block encodes are indicated. In one embodiment, the data values for all the texture elements that the block represents (encodes) are indicated. This would be appropriate, e.g., where the data values for all the texture elements are to be taken directly from the set of data values generated for the block. In another arrangement, only the data values for a selected number of the texture elements that the block encodes are indicated (e.g., the "endpoint" texture elements, where a fading pattern or interpolation path is to be used to derive data values for individual texture elements). This data could again be provided in the form of a data value index for each such texture element, or at least allow such an index to be derived.

Thus, in an example embodiment, the texture data block includes data indicating how to generate a set of data values (e.g. colours) to be used for the texture elements that the block represents, data indicating which data value or values (e.g. colour or colours) from the generated set of data value (e.g. colour) are to be used for a specified texture element or texture elements that the block represents, and data indicating a method to be used to generate the data value (e.g. colour) for each texture element that the block represents using the generated set of data values (e.g. colours) for the block and the indicated data value or values (e.g. colour or colours) for the specified texture element or elements.

In an example embodiment, the texture data block is encoded as a 64-bit block that encodes an 8×4 array of texture elements, preferably as two 4×4 sub-arrays (or blocks). The encoded data preferably includes a two-bit index indicating which of a predetermined set of four combinations of predefined data value set generation modes and texture element data value generation methods are to be used for reproducing the texture elements encoded by the block, with the remaining 62 bits then indicating data values to be used for individual texture elements, and, if necessary, other data, such as interpolation (fading) paths or directions, to be used when reproducing the encoded texture elements. Most preferably a stream of such texture data blocks is encoded, and provided in combination with, e.g., a data block specifying a base set or palette of data values to be used when generating the (sets of) data values for the texture data blocks.

The encoding process to produce a set of encoded data blocks of the form discussed above can be carried in any suitable manner on or using the original texture data that is to be encoded. For example, as in known prior art processes, the original data could be divided into blocks, and then each block encoded using the various different encoding possibilities that are available (i.e. that, in effect, an encoded texture data block can represent). This would provide a set of possible encoded blocks that can then be compared with the original data, so as to determine which encoded version (block) of the data gives the least error (on reproduction) when compared to the original data (which encoding arrangement can then be selected as the one to use for that original texture data block when it is encoded).

Although the technology has been described above with particular reference to the encoding of the texture data, as will be appreciated by those skilled in the art, the technology also extends to the reverse, decoding, process, i.e. in which the encoded texture data block is used to produce an array of texture data elements for use in graphics processing. This process would be essentially the reverse of the encoding process, and thus comprise, e.g., determining from the encoded texture data block how to generate the set of data values (e.g. colours) to be used for block, generating that set of data values (e.g. colours), determining from the encoded texture data block how the data value (e.g. colour) for each texture element is to be generated from the generated set of data values (e.g. colours), and then generating the data values (e.g. colours) for the individual texture elements accordingly. This process can, and indeed preferably does, also include the various features discussed herein, such as, for example, using an interpolation path or fading pattern to derive the data values to be used for the texture elements.

Thus, according to a sixteenth aspect, there is provided a method of decoding a texture data block that encodes a set of texture data elements to be used for graphics processing, comprising:

determining from the texture data block how to generate a set of data values to be used for the texture elements that the block represents;

generating a set of data values to be used for the texture elements that the block represents on the basis of that determination;

determining from the texture data block a method to be used to generate the data value for each texture element that the block represents using the generated set of data values for the block; and generating a data value for each texture element that the block represents using the set of data values generated for the block and the determined method to be used to generate the data value for each texture element.

According to a seventeenth aspect, there is provided an apparatus for decoding a texture data block that encodes a set of texture data elements to be used for graphics processing, comprising:

means for determining from the texture data block how to generate a set of data values to be used for the texture elements that the block represents;

means for generating a set of data values to be used for the texture elements that the block represents on the basis of that determination;

means for determining from the texture data block a method to be used to generate the data value for each texture element that the block represents using the generated set of data values for the block; and means for generating a data value for each texture element that the block represents using the set of data values generated for the block and the determined method to be used to generate the data value for each texture element.

According to an eighteenth aspect, there is provided a method of decoding a texture data block that encodes a plurality of sub-sets of texture data elements to be used for graphics processing, comprising:

reproducing each sub-set of texture data elements independently of the other sub-sets of texture data elements.

According to a nineteenth aspect, there is provided an apparatus for decoding a texture data block that encodes a plurality of sub-sets of texture data elements to be used for graphics processing, comprising:

means for reproducing each sub-set of texture data elements independently of the other sub-sets of texture data elements.

According to a twentieth aspect, there is provided a method of decoding a texture data block that encodes texture data to be used for graphics processing, comprising:

deriving a set of data values that is to be used as data values for the texture data block from a set of data values that has been encoded as a separate data block.

According to an twenty-first aspect, there is provided an apparatus for decoding a texture data block that encodes texture data to be used for graphics processing, comprising:

means for deriving a set of data values that is to be used as data values for the texture data block from a set of data values that has been encoded as a separate data block.

According to a twenty-second aspect, there is provided a method of decoding a texture data block that encodes a plurality of sub-sets of texture data elements to be used for graphics processing, comprising:

deriving a set of data values that is to be used as data values for the texture data block from a set of data values that has been encoded as a separate data block; and deriving from the encoded texture data block data specific to each sub-set of texture data encoded by the texture data block and data to be shared by the sub-sets of texture data encoded by the texture data block.

According to a twenty-third aspect, there is provided an apparatus for decoding a texture data block that encodes a plurality of sub-sets of texture data elements to be used for graphics processing, comprising:

means for deriving a set of data values that is to be used as data values for the texture data block from a set of data values that has been encoded as a separate data block; and means for deriving from the encoded texture data block data specific to each sub-set of texture data encoded by the texture data block and data to be shared by the sub-sets of texture data encoded by the texture data block.

According to a twenty-fourth aspect, there is provided a method of decoding a block of texture data that encodes a set of texture data elements to be used for graphics processing, comprising:

determining the data value to be used for at least one texture element that the texture data block encodes by interpolating the data value for that texture element based on the position of the texture element along a path that covers a number of the texture elements that the texture data block encodes.

According to a twenty-fifth aspect, there is provided an apparatus for decoding a block of texture data that encodes a set of texture data elements to be used for graphics processing, comprising:

means for determining the data value to be used for at least one texture element that the texture data block encodes by interpolating the data value for that texture element based on the position of the texture element along a path that covers a number of the texture elements that the texture data block encodes.

These aspects and arrangements can include any one or more or all of the features and embodiments discussed herein, as appropriate. For example, the set of data values for the decoded block could be generated by taking those data values directly from a base set of data values, and/or by deriving the data values from a base set of data values. Equally, the data values of the individual texture elements could be generated by taking them directly from the set of data values generated for the block, or by deriving those data values from that set of data values.

As will be appreciated from the above, in these decoding arrangements the actual data values (e.g. in terms of their format and what they represent) that are generated for the set of data values to be used for a texture data block and for each texture element will again depend on the nature of the texture data that is being encoded. Thus, for example, in the case of colour data and colour maps, each data value will represent a given colour, and, e.g., comprise a set of colour values, such as RGB or RGBa values, whereas for a luminance map, each data value may comprise and represent a single luminance value, etc.

The methods and apparatus can be implemented in any appropriate manner, e.g. in hardware or software-driven data processing circuitry, and in (and be included in) any appropriate device or component. In an example embodiment they are implemented in a graphics processor, and thus the technology described in this application also extends to a graphics processor configured to use the methods, or that includes the apparatus described. In an example embodiment, the methods and apparatus are implemented in hardware, preferably on a single semi-conductor platform.

Although the technology has been described above with particular reference to the encoding (and decoding) of texture data for graphics processors, as will be appreciated by those skilled in the art, it would equally be applicable to the encoding and decoding of other forms of data, and in particular to data that is in the form of (or can be expressed in the form of) arrays or blocks of (similar) data elements (e.g. data elements whose values follow a common or similar format and/or that will be or can be used for a similar or the same purpose or that represent similar information). It is in particular applicable to the encoding of such data where random access is desired.

Such "non-graphics" data could comprise, for example, vector-fields used for simulations, data representing flow-directions for fluids or bounce directions for impacts, etc. (which data would, for example, be analogous to the normal-maps (bump-maps) discussed above in relation to graphics data), heat-maps, or sound data, etc.

In such arrangements, the data can be encoded and decoded in an analogous manner to the texture data as described herein.

Thus, according to a twenty-sixth aspect, there is provided a method of encoding a set of data elements comprising:
  encoding the set of data elements as a block of data; and
  including in the data block:
  data indicating how to generate a set of data values to be used for the data elements that the block represents; and
  data indicating a method to be used to generate the data value for each data element that the block represents using the generated set of data values for the block.

According to a twenty-seventh aspect, there is provided an apparatus for encoding a set of data elements, comprising:
  means for encoding the set of data elements as a block of data;
  means for including in the data block data indicating how to generate a set of data values to be used for the data elements that the block represents; and
  means for including in the data block data indicating a method to be used to generate the data value for each data element that the block represents using the set of data values generated for the block.

According to a twenty-eighth aspect, there is provided a block of data representing a set of data elements, comprising:
  data indicating how to generate a set of data values to be used for the data elements that the block represents; and
  data indicating a method to be used to generate the data value for each data element that the block represents using the generated set of data values for the block.

According to a twenty-ninth aspect, there is provided a method of encoding a set of data elements, comprising:
  dividing the set of data elements into a plurality of sub-sets of such elements; and
  encoding the set of data elements as a single data block in which each sub-set of data elements is to be reproduced independently of the other sub-sets of data elements.

According to a thirtieth aspect, there is provided an apparatus for encoding a set of data elements, comprising:
  means for dividing the set of data elements into a plurality of sub-sets of such elements; and
  means for encoding the set of data elements as a single data block in which each sub-set of data elements is to be reproduced independently of the other sub-sets of data elements.

According to a thirty-first aspect, there is provided a block of encoded data representing a set of data elements, comprising: two or more sets of data, each set of data representing a sub-set of the set of data elements that is to be reproduced independently of the other sub-sets of data elements.

According to a thirty-second aspect, there is provided a method of encoding data, comprising:
  determining a set of data values that is representative of the data and encoding that set of data as a data block;
  dividing the data into a plurality of blocks; and
  encoding each data block as a separate encoded data block and including in each such encoded data block, data indicating a data value or values from the data values data block to be used for the encoded data block in question.

According to a thirty-third aspect, there is provided an apparatus for encoding data, comprising:
  means for determining a set of data values that is representative of the data and encoding that set of data values as a data block;
  means for dividing the data into a plurality of blocks; and
  means for encoding each data block as a separate encoded data block and including in each such encoded data block, data indicating a data value or values from the data values data block to be used for the encoded data block in question.

According to a thirty-fourth aspect, there is provided a set of encoded data, comprising:
  a data block that encodes a set of data values to be used for the set of encoded data; and
  a plurality of data blocks, each encoding a sub-set of the set of data, and each including data indicating a data value or values from the data values data block to be used for the data sub-set in question.

According to a thirty-fifth aspect, there is provided a method of encoding data, comprising:
  dividing the data into a plurality of sub-sets of data;
  encoding the data as a plurality of data blocks, each data block encoding two or more of the sub-sets of the data and including data specific to each sub-set of data and data to be shared by the sub-sets of data encoded by the data block; and
  encoding a data block comprising data to be shared by the data blocks.

According to a thirty-sixth aspect, there is provided an apparatus for encoding data, comprising:
  means for dividing the data into a plurality of sub-sets of data;
  means for encoding the data as a plurality of data blocks, each data block encoding two or more of the sub-sets of the data and including data specific to each sub-set of data and data to be shared by the sub-sets of data encoded by the data block; and
  means for encoding a data block comprising data to be shared by the data blocks.

According to a thirty-seventh aspect, there is provided a set of encoded data, comprising:
  a plurality of data blocks, each data block encoding two or more sub-sets of data and including data specific to each sub-set of data and data to be shared by the sub-sets of data encoded by the data block; and
  a data block comprising data to be shared by the data blocks.

According to a thirty-eighth aspect, there is provided a method of encoding a set of data elements, comprising:
  encoding the set of data elements as a texture data block; and
  including in the data block, data indicating a path or paths that covers a number of the data elements that the data block encodes and over which the data values for the data elements are to be interpolated.

According to a thirty-ninth aspect, there is provided an apparatus for encoding a set of data elements, comprising:

means for encoding the set of data elements as a data block; and means for including in the data block, data indicating a path or paths that covers a number of the elements that the data block encodes and over which the data values for the data elements are to be interpolated.

According to a fortieth aspect, there is provided a data block encoding a set of data elements, comprising:

data indicating a path or paths that covers a number of the data elements that the data block encodes and over which the data values for the data elements are to be interpolated.

According to a forty-first aspect, there is provided a method of decoding a data block that encodes a set of data elements, comprising:

determining from the data block how to generate a set of data values to be used for the data elements that the block represents;

generating a set of data values to be used for the data elements that the block represents on the basis of that determination;

determining from the data block a method to be used to generate the data value for each data element that the block represents using the generated set of data values for the block; and generating a data value for each data element that the block represents using the set of data values generated for the block and the determined method to be used to generate the data value for each data element.

According to a forty-second aspect, there is provided an apparatus for decoding a data block that encodes a set of data elements, comprising:

means for determining from the data block how to generate a set of data values to be used for the data elements that the block represents;

means for generating a set of data values to be used for the data elements that the block represents on the basis of that determination;

means for determining from the data block a method to be used to generate the data value for each data element that the block represents using the generated set of data values for the block; and means for generating a data value for each data element that the block represents using the set of data values generated for the block and the determined method to be used to generate the data value for each data element.

According to a forty-third aspect, there is provided a method of decoding a data block that encodes a plurality of sub-sets of data elements, comprising:

reproducing each sub-set of data elements independently of the other sub-sets of data elements.

According to a forty-fourth aspect, there is provided an apparatus for decoding a data block that encodes a plurality of sub-sets of data elements, comprising:

means for reproducing each sub-set of data elements independently of the other sub-sets of data elements.

According to a forty-fifth aspect, there is provided a method of decoding a data block that encodes a plurality of data, comprising:

deriving a set of data values that is to be used as data values for the data block from a set of data values that has been encoded as a separate data block.

According to a forty-sixth aspect, there is provided an apparatus for decoding a data block that encodes a plurality of data, comprising:

means for deriving a set of data values that is to be used as data values for the data block from a set of data values that has been encoded as a separate data block.

According to a forty-seventh aspect, there is provided a method of decoding a data block that encodes a plurality of sub-sets of data, comprising:

deriving a set of data values that is to be used as data values for the data block from a set of data values that has been encoded as a separate data block; and deriving from the encoded data block data specific to each sub-set of data encoded by the data block and data to be shared by the sub-sets of data encoded by the data block.

According to a forty-eighth aspect, there is provided an apparatus for decoding a data block that encodes a plurality of sub-sets of data, comprising:

deriving a set of data values that is to be used as data values for the data block from a set of data values that has been encoded as a separate data block; and deriving from the encoded data block data specific to each sub-set of data encoded by the data block and data to be shared by the sub-sets of data encoded by the data block.

According to a forty-ninth aspect, there is provided a method of decoding a block of data that encodes a set of data elements, comprising:

determining the data value to be used for at least one data element that the data block encodes by interpolating the data value for that data element based on the position of the data element along a path that covers a number of the data elements that the data block encodes.

According to a fiftieth aspect, there is provided an apparatus for decoding a block of data that encodes a set of data elements, comprising:

means for determining the data value to be used for at least one data element that the data block encodes by interpolating the data value for that data element based on the position of the data element along a path that covers a number of the data elements that the data block encodes.

These aspects and embodiments can again include any one or more or all of the features described herein, as appropriate. Thus, for example, the set of data values for the decoded block could be generated by taking those data values directly from a base set of data values, and/or by deriving the data values from a base set of data values. Equally, the data values of the individual data elements could be generated by taking them directly from the set of data values generated for the block, or by deriving those data values from that set of data values.

As will be appreciated by those skilled in the art, all of the aspects and embodiments described herein can include any one or more or all of the features described herein, as appropriate.

The methods may be implemented at least partially using software, e.g., computer programs, controlling suitable data processing circuitry. It will thus be seen that when viewed from further aspects, the technology described in this application provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The technology described in this application also extends to a computer software carrier comprising such software which when used to operate a data encoding or decoding system comprising data processing means causes in conjunction with said data processing means said system to carry out the steps of the method. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method need be carried out by computer software and thus from a further broad aspect the technology described in this application provides computer software and such software installed on a non-transitory computer software medium for carrying out at least one of the steps of the methods set out herein when the software is executed by a computer.

The technology described in this application may accordingly suitably be embodied as a computer program product for use with a computer system. Such an implementation may comprise a series of computer readable instructions fixed on a tangible medium, such as a computer readable medium, for example, diskette, CD-ROM, ROM, or hard disk. In another implementation, the instructions are transmittable to a computer system, via a modem or other interface device, over either a tangible medium, including but not limited to optical or analogue communications lines, or intangibly using wireless techniques, including but not limited to microwave, infrared or other transmission techniques.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments will now be described by way of example only and with reference to the accompanying drawings, in which.

An example embodiment will now be described with reference to the encoding of texture data for use in graphics processing that is in the form of a colour map (i.e. colour data). However, as discussed above, and as will be appreciated by those skilled in the art, the technology described in this application is applicable to data encoding and decoding in general, and so therefore should not be considered to be limited to the present example of texture colour data encoding.

Figure 1:
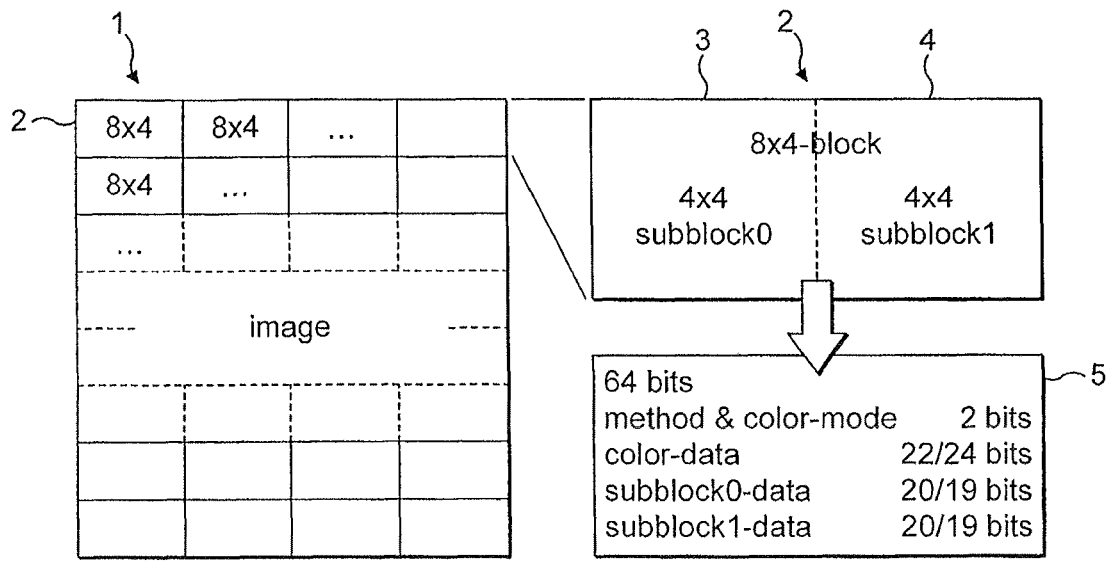
FIG. 1 shows schematically the encoding of an array of image data as a plurality of encoded data blocks in accordance with an embodiment.

FIG. 1 illustrates the basic encoding process of this embodiment. As shown in FIG. 1, an original image or array 1 of texture data elements (texels) (a texture "map") is subdivided into a plurality of 8×4 texture element blocks 2, each of which 8×4 texture element blocks 2 encodes two 4×4 texture element sub-blocks 3, 4.

In this embodiment, each texture element in the original texture map data array (image) represents the colour to be used at the position of the respective texture element, and accordingly has allocated to it a data value comprising a set of colour values (e.g. red, green, blue (RGB), and, optionally alpha (transparency) values. In other words, in this embodiment, the data values that are encoded and generated, etc., each correspond to and represent a colour (a set of colour values). For convenience, the following description will therefore refer primarily to "colours" but it should be understood that such references indicate a data value comprising a set of colour values that represent the colour in question.

In the present embodiment, rather than storing the array of colour data in its full, original form, each 8×4 texture element block 2 is encoded as a texture data block 5 that has a reduced size as compared to the texture data in its original, unencoded form. This, in effect, compresses the original texture data, thereby making its storage and processing easier and more efficient.

Each encoded, reduced size, texture data block 5 must, as is known in the art, contain sufficient and appropriate data to allow data corresponding to or representing the original, unencoded, data of the 8×4 texture element block in question to be reproduced.

This is achieved in the present embodiment by, inter alia, including in each encoded texture data block 5 data indicating a method to be used to generate a set of colours (i.e. colour values) to be used for the texture elements that the encoded data block 5 represents, and, also, data indicating a method to be used for generating the colours of the individual texture elements using that generated set of colours. Each encoded texture block 5 also includes other information that is necessary to allow the colours for each individual texture element that the block encodes to be reproduced in the decoding process, as will be discussed below.

Thus, as shown in FIG. 1, each encoded texture data block 5 includes a number of fields of data, namely 2 bits defining a method and colour mode, 22 or 24 bits defining colour data, 20 or 19 bits defining data for the first 4×4 sub-block of the 8×4 texture element block, and 20 or 19 bits defining data for the second 4×4 sub-block that is encoded by the texture data block 5.

As will be explained further below, the method and colour mode field of each encoded texture data block in this embodiment defines how a set of colours to be used for the encoded block is to be generated, and the method to be used to generate the colour for each individual texture element that the block encodes using that set of colours. The colour data field defines colour table (palette) indexes and delta values (see below) that are (typically) shared by (used for both) the 4×4 sub-blocks that the texture data block encodes, and the sub-block data fields define data specific to each encoded 4×4 sub-block (such as, as will be discussed below, fade-directions and colour-indexes for texture element colours). In the present embodiment, in colour mode 0 (see below) there are 22 bits in the colour-data field and 20 bits in each sub-block data field. In the other colour modes, there are 24 bits in the colour-data field and 19 bits in each sub-block data field.

Each encoded texture data block 5 uses 64 bits to encode its 8×4 texture element block, and thus the encoding rate is 2 bits per original texture element. (However, other arrangements would, of course, be possible.)

As well as, as discussed above, subdividing the original texture map (array) of texture data elements 1 into a plurality of 8×4 blocks 2 which are then each encoded as individual texture data blocks 5, in the present embodiment a base or primary set of colours (colour table) is generated for the texture data array (map) to be encoded. This primary colour table defines a set of 64 colours that has been found to best represent the colours appearing in the original data, and will be used, as will be discussed further below, to generate the colours to be used when reproducing each individual encoded texture data block 5.

The 64 colours that are defined in the primary colour table can be selected and generated as desired, for example, by analysing the colours present in the original texture element array, and selecting an appropriately representative set of 64 colours therefrom.

In the present embodiment, the primary colour table is derived from the entire image (including all mip-maps), i.e. such that the whole image, including all mip maps, uses the same, single primary colour table.

This primary colour table is stored in a header data block to the series of encoded texture data blocks that represent the texture data elements of the image, and consists of 64 "primary" colours, each defined with 16 bit precision. Other arrangements, both in terms of the number of colours, and the colour precision, would, of course, be possible.

In the present embodiment, the header that defines the primary colour table comprises 136 bytes, and has the following basic format:

| byte | description | value | type |
|---|---|---|---|
| 0 | Magic | 'F' | ASCII character array |
| 1 | | 'L' | |
| 2 | | 'X' | |
| 3 | File format version | See table below | Unsigned 8 bit |
| 4 | mip-map size | $\log_2$ (width) | Unsigned 8 bit |
| 5 | mip-maps present | 0 or 1 | Unsigned 8 bit |
| 6 | reserved | 0 | Unsigned 8 bit |
| 7 | reserved | 0 | Unsigned 8 bit |
| 8 | Primary color[0] | low byte | File format version dependent |
| 9 | | high byte | |
| 10 | Primary color[1] | low byte | File format version dependent |
| ... | ... | ... | ... |
| 134 | Primary color[63] | low byte | File format version dependent |
| 135 | | high byte | |

In this header, the data field "Magic" is used for file identification.

The third byte "File format version" defines the file format and in particular how the primary colours are to be defined. In the present embodiment, this "file format version" data field can have one of the following values:

| File format version | Name | Description |
|---|---|---|
| 0x00 | FLXTC Version 1 Opaque | RGB565 primary color type |
| 0x01 | FLXTC Version 1 Alpha | RGBA4444 primary color type |

Thus, the primary colours in the primary colour table can either be defined as RGB565 values, or as RGBA4444 values.

The fourth byte defines the mip-map size.

It should be noted here that in the present embodiment, the encoded texture data can be and preferably is stored in the form of mip-maps (i.e. where multiple versions of the original texture data array, each having different levels of detail (resolution), are stored for use). The mip-maps are preferably stored one after each other in memory, with each mip-map level being, as is known in the art, a downscaled (by a factor of 2) representation (image) of the original array (image). The mip-maps are stored in order of descending resolution, i.e. n×n, ..., 16×16, 8×8, 4×4, 2×2, 1×1. The smaller mip-maps (<8×8) are each stored individually in a separate encoded data block.

The mip-map size is defined as $\log_2$ (width). The mip-map height is set equal to the defined width (such that, in the present embodiment, only square mip-maps are supported).

The fifth byte is a "mip-maps present" field and can have a value of "0" or "1" (other values are illegal). If this "mip-maps present" byte has a value of "1", this indicates that a series of encoded texture maps (i.e. texture data arrays) with progressively lower resolution will follow at the end of the present file, down to the resolution of 1×1 (i.e. that a set of mip-maps is present).

Bytes 6 and 7 are reserved and set to have a value of "0".

The remaining bytes then define the 64 primary colours that make up the primary colour table.

It would of course be possible to use other arrangements for defining the primary colour table and providing it as a data block.

Thus, in the present embodiment, each encoded texture data file comprises a header of the form described above, defining, inter alia, a primary colour table to be used for the encoded texture data, and then a sequence of individual texture data blocks encoding the array of texture data elements (the image data). This is illustrated below:

| Size | Description |
|---|---|
| 136 bytes | Header - Primary Colour table |
| 8 bytes | texture data block 0 |
| 8 bytes | texture data block 1 |
| 8 bytes | texture data block 2 |
| 8 bytes | texture data block 3 |
| . | . |
| . | . |
| . | . |

The number of texture data blocks in the file will depend on the size of the texture map (texture data array) that is being encoded, and, e.g., whether the data is being stored in mip-map form. If mip-maps are used, then if the first level of texture map resolution is encoded using "n" texture data blocks, there will be "n/4" texture data blocks for the mip-map level below, "n/16" blocks for the next mip-map, "n/64" for the next, "n/256" for the next again, and so on (but no less than one block for each level) until the mip-map level with size 1×1 is reached.

Thus, for example, for a texture map comprising a 256×256 array of texture data elements (texels), that is to be encoded with mip-maps present, the encoded texture data file will comprise a header data block encoding, inter alia, a base or primary set of data values (e.g. colours), and then a sequence of 4096 texture data blocks encoding the full-sized texture map (256×256 array) followed by 1024 texture data blocks encoding a 128×128 mip-map, 256 texture data blocks encoding a 64×64 mip-map, 64 texture data blocks encoding a 32×32 mip-map, 8 texture data blocks encoding a 16×16 mip-map, 2 texture data blocks encoding an 8×8, 1 texture data block encoding a 4×4 mip-map, 1 texture data block encoding a 2×2 mip-map, and 1 texture data block encoding a 1×1 mip-map.

In the present embodiment, all multi-byte values in the data blocks are stored in little endian byte order. Thus, for example, each of the individual texture data element blocks are stored as little endian 64 bit values. However, other arrangements would, of course, be possible.

Figure 2:
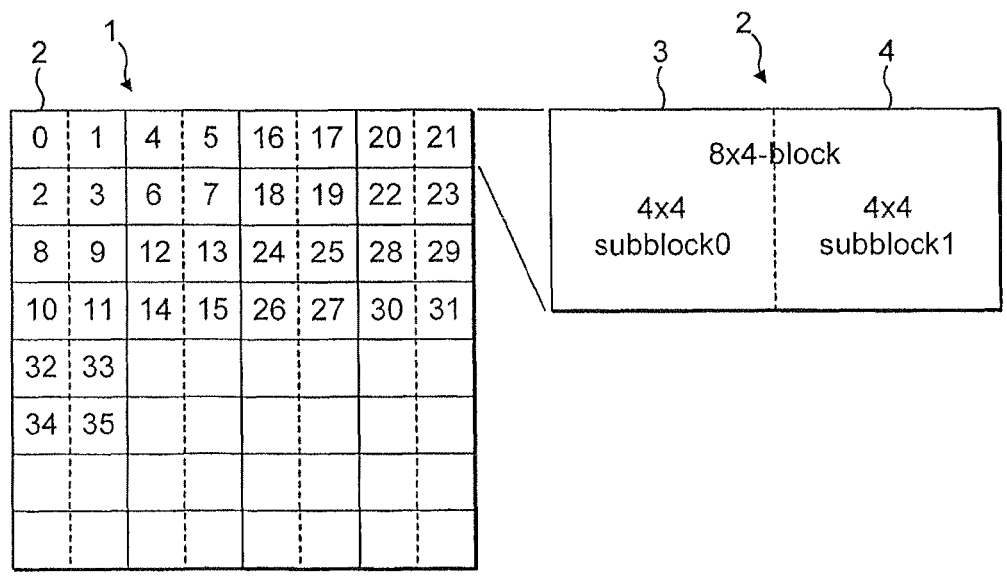
FIG. 2 shows schematically the order of encoding of the blocks that the image is divided into in the described embodiment.

The individual texture data blocks are further arranged such that the 4×4 texture element sub-blocks that are encoded by the texture data blocks are in Morton order. Thus, if the texel location is x, y, and $x_{15}$-$x_0$ and $y_{15}$-$y_0$ are the bits in x, y, the block position (in bytes) is $y_{15}x_{15}y_{14}x_{14} \ldots y_3x_3y_2 \ll 2$, and the texel position inside the block is $x_2y_1x_1y_0x_0$. An example of this block layout for a 32×32 array (map) is shown in FIG. 2.

Returning now to the individual encoded texture data blocks, as discussed above, the method and colour mode data field included in these blocks is a 2 bit field that defines firstly how to generate a set of colours to be used for the encoded texture data block, and, secondly, the method to be used for generating the colours to be used for the individual texture elements using the set of colours generated for the texture element block when they are to be reproduced (i.e. when the block is decoded). In the present embodiment, four different colour set generation modes can be indicated, together with two different basic methods for generating the colours of the individual texture elements. Which of these four colour set generation modes and two colour generation methods is to be used is indicated by the 2 bit method and colour mode data field as follows.

| 2 Bit Field | Method | Colour Mode |
|---|---|---|
| 00 | 0 | 0 |
| 01 | 1 | 1 |
| 10 | 1 | 2 |
| 11 | 1 | 3 |

As will be described in more detail below, the colour mode indicated by the 2 bit method and colour mode data field basically indicates a process to be used to generate a set of four colours to be used when reproducing the texture elements that the texture data block 5 in question encodes. Each of the four colour modes basically generates the set of four colours using one or more colours selected from the primary (base) set of colours that has already been defined for the image or texture data element array to be encoded (as discussed above).

In the present embodiment, colour mode 0 generates the set of colours for the texture data block by taking those colours directly from the predefined primary colour table (i.e. uses direct mapping into the primary colour table), whereas colour modes 1-3 generate their sets of four colours by taking two, three or four colours directly from the primary colour table, and by generating one or more additional colours by interpolating or adjusting the colours taken directly from the primary colour table. The possibility of using these different modes of colour set generation for each encoded texture data block allows the decoding process to reconstruct colours with higher precision than the colour representation in the base primary colour table.

As discussed above, the method defined in the method and colour mode data field of a texture data block is used to generate the colour to be used for each individual texture element that the texture data block encodes (once the set of four colours to be used for reproducing the texture elements encoded by the texture data block have been generated in accordance with the defined colour mode).

In the present embodiment, two colour generation methods can be defined. The first such method, method 0, uses for each texture element a colour taken directly from the set of colours generated for the texture data block. In this case, each texture data element has, in effect, an index that is used to select between the four colours generated for the texture data block. This individual texture element colour generation method has been found to be very effective for arrangements that have many different colours and high frequency, such as is typically found in artificial drawings, and is used, in the present embodiment, in combination with colour set generation mode 0.

The second texture element colour generation method, method 1, uses colours that are interpolated or derived from the four colours generated for the texture data block. In particular, in the present embodiment, in each 4×4 texture element sub-block encoded by the texture data block, half the texture elements select their colour directly from the set of four colours generated for the texture data block, but the colours for the remaining texture elements are generated by interpolating between these colours in a fading pattern that has been specified for the sub-block. (In practice, one of eight different predefined fading patterns.) This colour generation method has been found to be better for reconstruction of texture element blocks that have many similar colours and lower frequency, such as photo-realistic textures, and is used, in this embodiment, in combination with colour set generation modes 1 to 3.

These arrangements will be discussed in more detail below.

This combination of colour set generation mode and texture element colour generation methods accordingly allows any given 8×4 texture element block to be encoded using one of four different ways for reconstructing the colours best representing the original texture element colours using the primary colour table, and, furthermore, the option of either directly mapping colours from the set of colours generated for the encoded texture data block to the individual texture elements that the texture data block encodes (e.g. for images with sharp edges), or using one of a number of selected shading or fading patterns from the reconstructed colours and additional colours in the set of four colours generated for the individual texture data block.

It would, of course, be possible to use other arrangements, such as the possibility of defining more colour set generation modes, and texture element colour generation methods, or differing combinations of such modes and methods, etc.

As can be seen from the above, the basic decoding process in the present embodiment comprises firstly generating a set of colours for the encoded texture data block using the colour set generation mode indicated by the method and colour data mode field of the encoded texture data block, and then using that generated set of colours to generate a colour for each individual texture element that the block encodes using the texture element colour generation method indicated by the method and colour mode data field.

Figure 3:
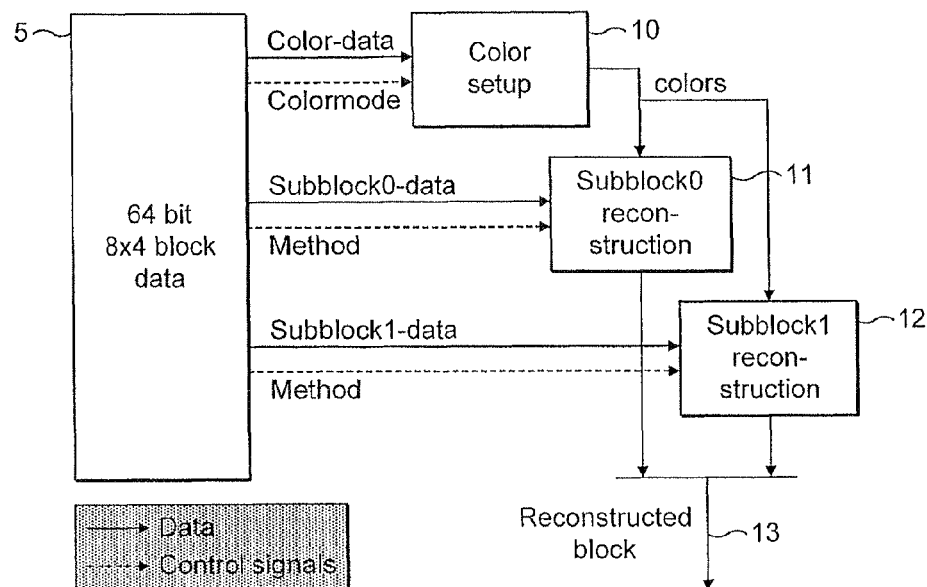
FIG. 3 shows a decoding process for the encoded data of an embodiment.

FIG. 3 illustrates this decoding process.

The first stage of the decoding process is a colour set-up stage 10, that uses the colour mode indicated by the method and colour mode data field in the encoded texture data block 5, together with the colour data defined in the texture data block 5, to generate a set of four colours that will be used for the individual texture elements that the texture data block 5 encodes. The result of this stage 10 is four colours that have been found at the encoding stage to best represent the 8×4 texture element array that the texture block 5 encodes.

Once this set of four colours for the encoded 8×4 texture element array has been generated (reconstructed), the data for each individual texture element encoded by the block is then reconstructed using the generated set of four colours as a foundation. As shown in FIG. 3, each 4×4 texture element sub-block encoded by the texture data block 5 is decoded independently (in decoding stages 11, 12), using the indicated texture element colour generation method indicated by the method and colour mode data field, and the relevant sub-block data defined in the encoded texture data block 5. This then provides a reconstructed 8×4 array of texture elements 13 that can then be used to render the image to be displayed, as is known in the art.

Each encoded texture data block provided for the image is decoded in this manner. The effect of this is that each 8×4 texture element block is decoded independently. This allows the encoding process to take full advantage of all the different coding options, and has been found to provide high quality images without the need to make compromises on texture compression ratios.

The four different colour modes (i.e. methods for generating a set of colours for a texture data block) used in the present embodiment will now be described in more detail.

As discussed above, each of the colour set generation modes used in the present embodiment derives a set of four colours to be used for the texture elements encoded by the texture data block from the primary colour table that is provided in the separate, header data block. In essence, the set of colours for a given texture data block is generated by fetching a colour or colours from the primary colour table and, where necessary, adjusting those colours to more exact colours, to provide a set of four colours (denoted as col[0-3]) to be used to generate the colours for the individual texture elements for each block.

Depending on the colormode, 2, 3 or 4 colors (pri[0-3]) are picked from the primary color table for this purpose. This is done by using two or three indexes ($pri_{index}[0]$ & $pri_{index}[2]$ (& $pri_{index}[3]$, where appropriate)) that identify the colours to be picked from the primary color table, and, where appropriate, two delta-values ($pri_{delta}[1]$ & $pri_{delta}[3]$) that will be used, in combination with the other primary indexes, to derive indexes that identify other colours to be picked from the primary colour table. The exact combination of indexes and delta values that is used depends on the colour mode, as follows:

| colormode | given indexes | deduced indexes |
|---|---|---|
| 0 | $pri_{index}[0]$<br>$pri_{index}[2]$ | $pri_{index}[1] = (pri_{index}[0] + pri_{delta}[1] + 1)\, 0x3F$<br>$pri_{index}[3] = (pri_{index}[2] + pri_{delta}[3] + 1)\, 0x3F$ |
| 1 | $pri_{index}[0]$<br>$pri_{index}[2]$<br>$pri_{index}[3]$ | — |
| 2, 3 | $pri_{index}[0]$<br>$pri_{index}[2]$ | — |

Using these indexes, 2-4 initial colors to be used for the texture data block are selected from the primary color table (referred to as "primaries"):

$x \in \{0, 1, 2, 3\}$ where colormode=0
$pri[x]=primaries[pri_{index}[x]]|$ where $x \in \{0,2,3\}$ where colormode=1
$x \in \{0,2\}$ where colormode $\in \{2,3\}$ In colour mode 0, the initial (primary) colours selected from the primary colour table (base set of colours) are used directly, i.e.

$col[x]=pri[x]|$ where $x \in [0-3]$

Figure 4:
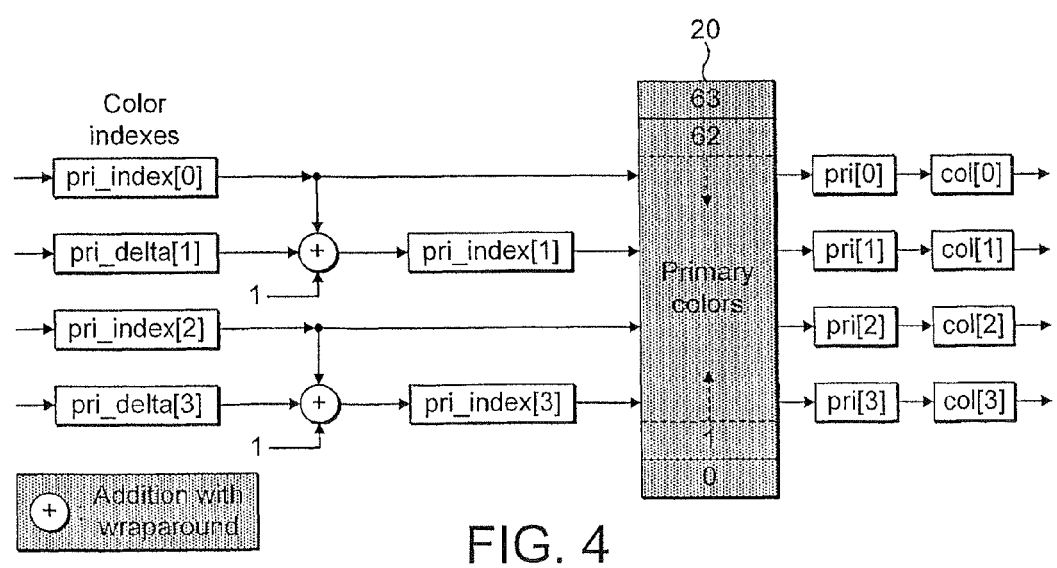
FIG. 4 shows schematically a colour generation process that is used in an embodiment.

This is illustrated by FIG. 4. Thus, as shown in FIG. 4, $pri_{index}[0]$ and $pri_{index}[2]$ defined for the texture data block are used to select colours col[0] and col[2] to be used for the block directly from the primary colour table 20. $pri_{index}[0]$ and $pri_{delta}[1]$ are used to derive $pri_{index}[1]$ then used to select col[1] from the primary colour table, and $pri_{index}[2]$ and $pri_{delta}[3]$ are used to derive $pri_{index}[3]$ which is then used to select col[3] from the primary colour table 20.

Colour set generation modes 1 to 3, on the other hand, use an adjustment technique to make more accurate colors from the colors selected from the primary colour table. To do this, a 2-bit per component signed value ($col_{delta-bits}[0]$ and $col_{delta-bits}[2]$, 6 bits 5:0 RRGGBB-format) is expanded to form a full per-component delta-value ($col_{delta}[0]$ and $col_{delta}[2]$). This is done by placing the two bits belonging to each component at the highest bit-position of each component, padding with 0 for all lower bits, and then right-shifting (with sign-preservation) the result by a colour mode-specific amount of bits:

| colour mode | amount of bits to right-shift |
|---|---|
| 1 | 3 for $col_{delta}[0]$, $col_{delta}[2]$ is not used |
| 2 | 2 for $col_{delta}[0]$, 3 for $col_{delta}[2]$ |
| 3 | 3 for $col_{delta}[0]$, 4 for $col_{delta}[2]$ |

For example, if $col_{delta-bits}[0]=0x36$, this will be split into 0x3, 0x1, 0x2 for each of the R:G:B-components (R:G:B 2:2:2-format). In case of 8 bit component-values, this will expand to: 0xF8, 0x08, 0xF0 for colour mode 1 and 3, and 0xF0, 0x10, 0xE0 for colour mode 2. The reconstructed delta-values from $col_{delta-bits}[0]$ are stored as $col_{delta}[0]$, and the reconstructed delta-values from $col_{delta-bits}[2]$ are stored as $col_{delta}[2]$.

These delta values are added to the base colour values directly (with clamping to each respective component min/max-values). (Alpha-values are not given any delta-value.)

In colour mode 1, three colours from the primary colour-table are selected and then used to generate the set of four colours to be used for the texture data block. In this case, two of the selected colours are used directly to provide two of the colours in the set, one is adjusted using a delta-value to provide another colour for the set, and then that adjusted colour is blended with one of the other colours to provide a fourth colour for the set. Thus, in this colour mode:

$$col[0] = pri[0] + col_{delta}[0]$$

$$col[1] = \frac{(col[0] + col[2])}{2}$$

$$col[2] = pri[2]$$

$$col[3] = pri[3]$$

In colour mode 2, two colours from the primary colour-table are selected. Both of these colours are then adjusted to provide two colours of the set of four colours to be used for the texture data block. The adjusted colours are then blended in differing proportions to provide the other two colours to be used for the block.

In this mode $col_{delta}[0]$ is constructed from $col_{delta\text{-}bits}[0]$ by right-shifting each component 2 bits, and $col_{delta}[2]$ is constructed from $col_{delta\text{-}bits}[2]$ by right-shifting each component 3 bits.

Thus:

$$col[0] = pri[0] + col_{delta}[0]$$

$$col[1] = \frac{(2*col[0] + col[2])}{3}$$

$$col[2] = pri[2] + col_{delta}[2]$$

$$col[3] = \frac{(col[0] + 2*col[2])}{3}$$

Colour mode 3 is similar to colour mode 2.
Thus, again, $$col[0] = pri[0] + col_{delta}[0]$$

$$col[1] = \frac{(2*col[0] + col[2])}{3}$$

$$col[2] = pri[2] + col_{delta}[2]$$

$$col[3] = \frac{(col[0] + 2*col[2])}{3}$$

However, in this mode $col_{delta}[0]$ is constructed from $col_{delta\text{-}bits}[0]$ by right-shifting each component 3 bits, and $col_{delta}[2]$ is constructed from $col_{delta\text{-}bits}[2]$ by right-shifting each component 4 bits.

The methods that can be used in the present embodiment to generate the colour for each individual texture element using the set of four colours generated for the texture data block when reproducing the encoded texture elements will now be described in more detail.

As discussed above, in the present embodiment two such methods can be specified for generating the colours of the individual texture elements, and the method indicated for use for a texture data block is applied to each 4×4 sub-block of texture element independently (i.e. such that the same colour generation method is used for each 4×4 sub-block that the texture data block encodes, but is applied separately to each 4×4 texture element sub-block).

The first texture element colour generation method, method 0, uses colours taken directly from the set of colours generated for the texture data block, and is intended to be used for reproducing drawings.

In this texture element colour generation method, the texture elements inside the encoded 4×4 texture element block are arranged in the following order:

| 0 | 1 | 4 | 5 |
|---|---|---|---|
| 2 | 3 | 6 | 7 |
| 8 | 9 | 12 | 13 |
| 10 | 11 | 14 | 15 |

These texture element positions will be referred to as the pixel number ($pixel_{nr}$) herein. Each of these texture elements are assigned one bit, called the low index for that texture element. These low index bits are stored in an array called $index_{low}$, and referenced as index low [$pixel_{nr}$].

The 4×4 texture element block is then subdivided into 2×2 texture element blocks, arranged in the following order:

| 0 | 1 |
|---|---|
| 2 | 3 |

Each such 2×2 texture element block is then assigned another bit, called the high index. This index is the same for all the 4 texture elements in the 2×2 block. These high indexes are stored in an array called $index_{high}$, and referenced as $index_{high}[pixel_{nr}>>2]$ for each texture element.

To generate the colour to be used for a specific texture element upon reproduction, the high index for that texture element is combined with its low index to get the full colour index:

$$index_{color}[pixel_{nr}]=([pixel_{nr}>>2]<<1)index_{low}[pixel_{nr}]$$

This index is then used to look up the colour to be used in the 4-colour lookup-table (i.e. set of colours) that has been generated for the texture data block in question:

$$color[pixel_{nr}]=col[index_{color}[pixel_{nr}]]$$

The second texture element colour generation method that is used in the present embodiment, method 1, generates the colours for half the texels encoded in each 4×4 sub-block by selecting their colours directly from the set of four colours generated for the texture data block, but the colours for the remaining texture elements are generated by interpolating between texture element values in a sub-block specific fading pattern. There are a total of 8 fading directions that can be used in this method. This texture element colour generation method is used for photo-realistic textures.

In this texture element colour generation method, a sub-block specific fading pattern that comprises a number of interpolation paths that cover a number of the texture elements in the block is defined and applied to the texture elements encoded by the texture data blocks. In particular, for each interpolation path of the fading pattern, the colours for the texture elements at the end points of the interpolation path are taken directly from the set of four colours generated for the texture data block, and the colours for the intermediate texture elements along the interpolation path are linearly interpolated from the end point colours.

Figure 5:
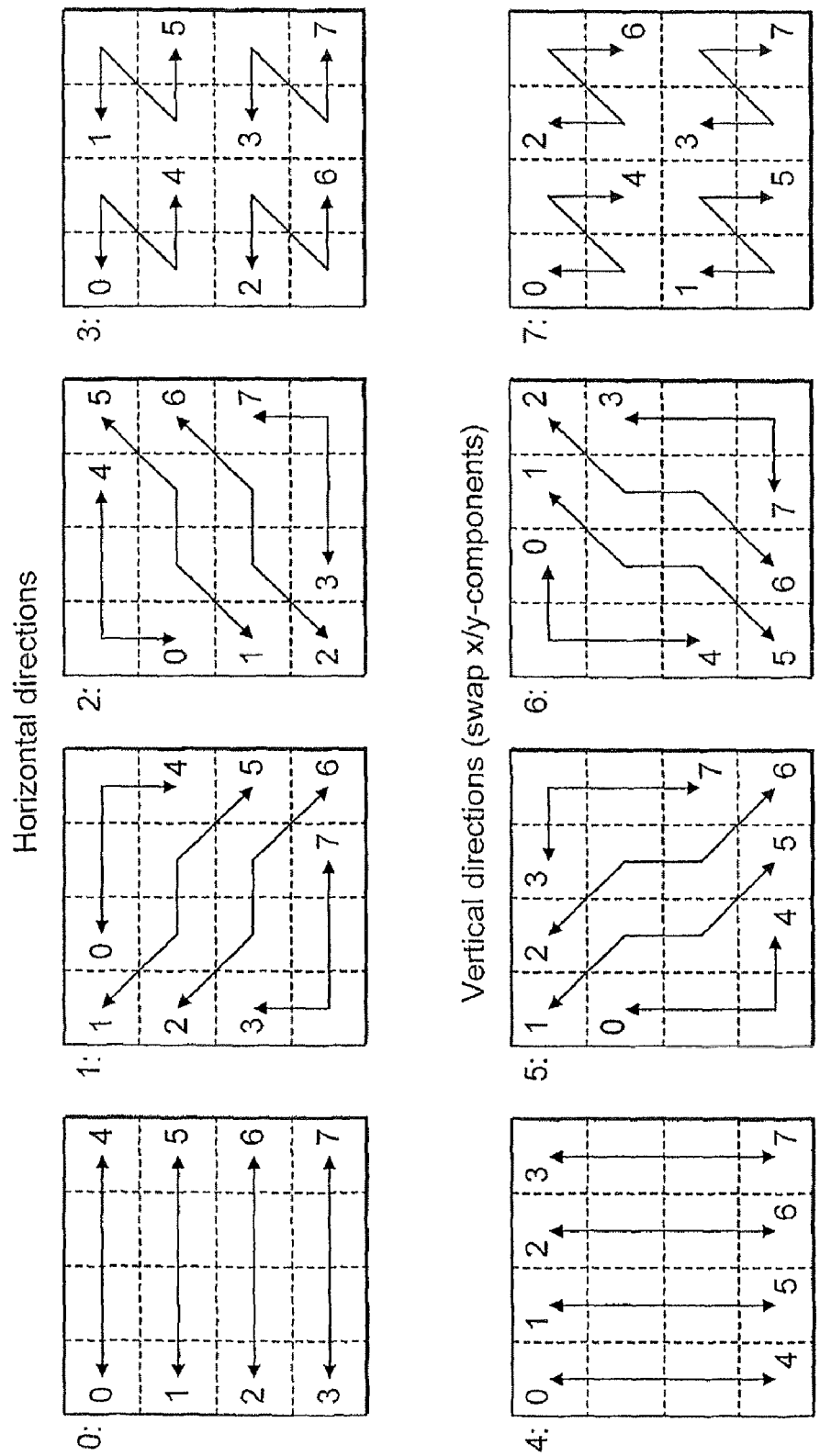
FIG. 5 shows schematically a colour interpolation process used in an embodiment.

FIG. 5 shows the possible fading patterns that can be used in the present embodiment. As can be seen, each fading pattern comprises a set of four interpolation paths that each individually cover four texture elements in a 4×4 texture element sub-block (with the four interpolation paths thereby together covering all of the texture elements in the 4×4 array).

As can be seen from FIG. 5, there are eight fading patterns in total, which are defined by two major directions, horizontal and vertical, and four sub-directions. In this arrangement, the "vertical" directions for the fading patterns are exactly the same as the "horizontal" directions, except that the x and y components of each texture element inside the texture element array is swapped.

In order to encode the fading directions to be used with this texture element colour generation method, the direction of the fade pattern is identified and encoded in the texture data blocks. This encoding consists of including in the texture data block the colour at each end point in the fade pattern and the direction of the fade pattern (i.e. which major direction, and which sub-direction, as shown in FIG. 5, is to be used). For this encoding, one bit is used to indicate the major direction of the fading pattern, and two bits are used to indicate the sub-direction (i.e. as an index into which of the four sub-directions is to be used). Then, for each end point of an interpolation path within the fading direction, the colour to be used for that end point texture element is encoded by means of a two bit index into the set of four colours to be generated for the texture data block.

To do this, as shown in FIG. 5, each endpoint of an interpolation path is given a number (nr). There are 8 endpoint-numbers, 0 to 7. Colour-indexes for the endpoints are then stored in a 2-bit per element array called indexes, and indexed by indexes[nr], where indexes[0] indicates the two lowest bits. These two bits are used to index the endpoint colour in the 4-colour (table) generated for the texture data block. The final endpoint colour for an endpoint is endpoint$_{color}$[nr]=col[indexes [nr]].

The colours for the two remaining texture elements in the middle of the each interpolation path are generated by doing linear interpolation between each of the endpoint colours of the interpolation path. Thus, in all cases (any fading direction or pattern), the resulting colours for the 4 texture elements covered by a given interpolation path will be:

$$\begin{bmatrix} texel0: & endpoint_{color}[x] \\ texel1: & \left(endpoint_{color}[x] * \frac{5}{8}\right) + \left(endpoint_{color}[y] * \frac{3}{8}\right) \\ texel2: & \left(endpoint_{color}[x] * \frac{3}{8}\right) + \left(endpoint_{color}[y] * \frac{5}{8}\right) \\ texel3: & endpoint_{color}[y] \end{bmatrix}$$

Thus, for example, for direction 1 with endpoints 2 and 6 (see FIG. 5), the following texture elements will get the following values:

| Texture element-coordinate | texture element-color |
|---|---|
| (0, 1) | endpoint$_{color}$[2] |
| (1, 2) | (endpoint$_{color}$[2]*ε) + (endpoint$_{color}$[6]*δ) |
| (2, 2) | (endpoint$_{color}$[2]*δ) + (endpoint$_{color}$[6]*ε) |
| (3, 3) | endpoint$_{color}$[6] |

As will be appreciated from the above, the actual data that is encoded in each texture data block 5 will depend, inter alia, upon the colour set generation mode and texture element colour generation method to be used for the texture data block in question. However, the order of bits in the encoded texture data block is such that all the bit positions are the same in each 32 bit 4×4 encoded texture element sub-block. This makes the decoding process easier.

The actual bit layout for the texture data blocks 5 that is used in the present embodiment is as follows:

Other arrangements would, of course, be possible.

The above primarily describes the decoding process used in this example embodiment. As will be appreciated by those skilled in the art, the encoding process will be carried out in a corresponding converse manner. Thus, the actual way that any given array of texture data elements is encoded can be selected, for example, as is known in the art, by encoding the array using each possible encoding arrangement, and then reproducing the so-encoded texture data blocks and comparing the reproduced data with the original data, to see which encoding arrangement provides the closest match to the original data. That encoding process is then used to generate the encoded texture data block for the texture data element array in question.

Although the above embodiment has been described with reference to texture data in the form of colours, as discussed above, and as will be appreciated by those skilled in the art, the technology described in this application is also applicable to other forms of texture data, such as luminance-maps or bump-maps, etc., and to other, non-texture data. In such arrangements the data can be encoded or decoded in an advantageous manner, but each data value will, e.g., represent a luminance value or normal vector, etc., rather than a colour.

As can be seen from the above, the technology described in this application provides, in example embodiments at least, a data compression format for use, e.g., for texture maps in hardware graphics acceleration, that is in particular suited for applications where random access into the encoded data is desired. It provides a high compression rate (for example, a fixed rate 2-bit per texture element format in its preferred embodiments at least), which accordingly is advantageous for handheld applications where power, bandwidth and storage space may be limited. Notwithstanding the relatively high compression rate and smaller compact nature of the data compression format, it is still very capable of compressing, for example, different kinds of images, and in particular both real-world images and drawings, with little loss of quality.

Thus the technology described in this application has particular application to the mobile gaming market, since it provides a high compression rate and therefore is suitable for devices with limited memory resources and memory bandwidth. The high compression rate also facilitates, for example, downloading of games or other applications, since it can alleviate network bandwidth and end user cost issues which increase or are related to the download time.

Furthermore, this can be achieved whilst still providing high image quality (which, as is known in the art, is critical for small mobile devices that have a limited screen size (as is known in the art, the smaller the size and resolution of a

| | description | | |
|---|---|---|---|
| bits | colormode = 0 | colormode = 1 | colormode ε{2, 3} |
| 63 | | colormode, bit 1 | |
| 62: 60 | high index 3: 1, subblock 1 | direction, subblock 1 | |
| 59 | high index 0, subblock 1 | pal$_{index}$[3], bit 5 | col$_{delta\text{-}bits}$[2], bit 5 |
| 58-54 | Δpal$_{index}$[3] | pal$_{index}$[3], bit 4: 0 | col$_{delta\text{-}bits}$[2], bit 4: 0 |
| 53-48 | | pal$_{index}$[2] | |
| 47: 32 | low index 15: 0, subblock 1 | endpoint indexes, subblock 1 | |
| 31 | | colormode, bit 0 | |
| 30-28 | high index 3: 1, subblock 0 | direction, subblock 0 | |
| 27 | high index 0, subblock 0 | col$_{delta\text{-}bits}$[0], bit 5 | |
| 26-22 | Δpal$_{index}$[1] | col$_{delta\text{-}bits}$[0], bit 4: 0 | |
| 21-16 | | pal$_{index}$[0] | |
| 15: 0 | low index 15: 0, subblock 0 | endpoint indexes, subblock 0 | | screen, the more effect on the perceived image quality noise or other errors has)). The technique can also be used for a wide range of texture maps, such as including high contrast scenarios (e.g. drawings) and textures with alpha (transparency) values.

This is achieved in the example embodiments at least, by including in individual encoded texture data blocks information allowing a base table of data values (e.g. colours) to be changed or modulated in different ways to create the actual data values (e.g. colours) to be used for the block. This allows the range of data values (e.g. colours) provided by a base or primary data value (e.g. colour) table to be extended as desired on a block-by-block basis.

Furthermore, in its example embodiments at least, each encoded texture data block can use one of four ways of reconstructing the data values best representing the original block from the base data value table. Direct mapping to the data value table is used for images with sharp edges, whereas shading patterns are provided and additional data values can be generated for representing photo-realistic images. This has been found to provide high quality reproduced images, but without the need for significant compromises on texture compression ratios.

The invention claimed is:

1. A method of encoding a set of texture data elements to be used for graphics processing, comprising:
    dividing by a data processing device the set of texture data elements into a plurality of sub-sets of such elements; and
    encoding by a data processing device two or more of the sub-sets of texture data elements as a single texture data block in which each encoded sub-set of texture data elements is to be reproduced independently of the other sub-sets of texture data elements.

2. The method of claim 1, comprising encoding in the texture data block a common single set of data indicating how to generate a set of data values to be used for the block and the method to be used to generate the data values for the texture elements of the block, which set of data is to be shared by the sub-sets of texture data elements that the block encodes.

3. The method of claim 1, comprising encoding in the texture data block data specific to each sub-set of texture data elements and data to be shared by the sub-sets of texture data elements encoded by the texture data block.

4. A method of decoding a texture data block that encodes a plurality of sub-sets of texture data elements to be used for graphics processing, comprising:
    reproducing each sub-set of texture data elements independently of the other sub-sets of texture data elements.

5. The method of claim 4, comprising deriving from the encoded texture data block a common single set of data indicating how to generate a set of data values to be used for the block and the method to be used to generate the data values for the texture elements of the block, which set of data is to be shared by the sub-sets of texture data elements that the block encodes.

6. The method of claim 4, comprising deriving from the encoded texture data block data specific to each sub-set of texture data encoded by the texture data block and data to be shared by the sub-sets of texture data encoded by the texture data block.

7. An apparatus for encoding a set of texture data elements to be used for graphics processing, comprising:
    means for dividing the set of texture data elements into a plurality of sub-sets of such elements; and
    means for encoding two or more of the sub-sets of texture data elements as a single texture data block in which each encoded sub-set of texture data elements is to be reproduced independently of the other sub-sets of texture data elements.

8. The apparatus of claim 7, comprising means for encoding in the texture data block a common single set of data indicating how to generate a set of data values to be used for the block and the method to be used to generate the data values for the texture elements of the block, which set of data is to be shared by the sub-sets of texture data elements that the block encodes.

9. The apparatus of claim 7, comprising means for encoding in the texture data block data specific to each sub-set of texture data elements and data to be shared by the sub-sets of texture data elements encoded by the texture data block.

10. An apparatus for decoding a texture data block that encodes a plurality of sub-sets of texture data elements to be used for, graphics processing, comprising:
    a processor configured to reproduce each sub-set of texture data elements independently of the other sub-sets of texture data elements.

11. The apparatus of claim 10, comprising a processor deriving from the encoded texture data block a common single set of data indicating how to generate a set of data values to be used for the block and the method to be used to generate the data values for the texture elements of the block, which set of data is to be shared by the sub-sets of texture data elements that the block encodes.

12. The apparatus of claim 10, comprising a processor for deriving from the encoded texture data block data specific to each sub-set of texture data encoded by the texture data block and data to be shared by the sub-sets of texture data encoded by the texture data block.

13. A graphics processor comprising the apparatus of claim 10.

14. A computer program product comprising computer software code embodied in a non-transitory, computer-readable medium for performing the method of claim 1 when the software code is executed by a computer.

15. A method of encoding a set of texture data elements to be used for graphics processing, comprising:
    a processor configured to encode the set of texture data elements as a texture data block; and
    a processor configured to include in the texture data block, data indicating a path or paths that covers a number of the texture elements that the texture data block encodes and over which data values for the texture elements are to be interpolated.

16. The method of claim 15, comprising including in the texture data block data indicating the end point data values for the path or paths over which data values for the texture elements are to be interpolated.

17. The method of claim 15, comprising including in the texture data block, data indicating the interpolation scheme to be used along the path or paths over which data values for the texture elements are to be interpolated.

18. The method of claim 15, wherein the data indicating a path or paths that covers a number of texture elements that the texture data block encodes indicates the end points of the interpolation path or paths and the path or paths to be followed between those end points.

19. The method of claim 15, wherein there is a predefined set or sets of interpolation paths for application to the texture data elements of a texture data block, and the data indicating a path or paths that covers a number of texture elements that the texture data block encodes indicates which set of interpolation paths is to be applied to the texture data elements of the texture data block.

20. The method of claim 15, wherein the texture data block represents plural different sub-sets of texture data elements that are to be reproduced independently of each other, and the method comprises including in the texture data block, data indicating interpolation paths to be applied to each sub-set of texture elements.

21. A method of decoding a block of texture data that encodes a set of texture data elements to be used for graphics processing, comprising:
   determining by a data processing device the data value to be used for at least one texture element that the texture data block encodes by interpolating the data value for that texture element based on the position of the texture element along a path that covers a number of the texture elements that the texture data block encodes.

22. The method of claim 21, comprising determining from the texture data block data indicating the end point data values for the path or paths over which data values for the texture elements are to be interpolated.

23. The method of claim 21, comprising determining from the texture data block, data indicating the interpolation scheme to be used along the path or paths over which data values for the texture elements are to be interpolated.

24. The method of claim 21, comprising determining from the texture data block the end points of the interpolation path or paths and the path or paths to be followed between those end points.

25. The method of claim 21, wherein there is a predefined set or sets of interpolation paths for application to the texture data elements of a texture data block, and the method comprises determining from the texture data block which set of interpolation paths is to be applied to the texture data elements of the texture data block.

26. The method of claim 21, wherein the texture data block represents plural different sub-sets of texture data elements that are to be reproduced independently of each other, and the method comprises determining from the texture data block, data indicating interpolation paths to be applied to each sub-set of texture elements.

27. An apparatus for encoding a set of texture data elements to be used for graphics processing, comprising:
   means for encoding the set of texture data elements as a texture data block; and
   means for including in the texture data block, data indicating a path or paths that covers a number of the texture elements that the texture data block encodes and over which data values for the texture elements are to be interpolated.

28. The apparatus of claim 27, comprising means for including in the texture data block data indicating the end point data values for the path or paths over which data values for the texture elements are to be interpolated.

29. The apparatus of claim 27, comprising means for including in the texture data block, data indicating the interpolation scheme to be used along the path or paths over which data values for the texture elements are to be interpolated.

30. The apparatus of claim 27, wherein the data indicating a path or paths that covers a number of texture elements that the texture data block encodes indicates the end points of the interpolation path or paths and the path or paths to be followed between those end points.

31. The apparatus of claim 27, wherein there is a predefined set or sets of interpolation paths for application to the texture data elements of a texture data block, and the data indicating a path or paths that covers a number of texture elements that the texture data block encodes indicates which set of interpolation paths is to be applied to the texture data elements of the texture data block.

32. The apparatus of claim 27, wherein the texture data block represents plural different sub-sets of texture data elements that are to be reproduced independently of each other, and the apparatus comprises means for including in the texture data block, data indicating interpolation paths to be applied to each sub-set of texture elements.

33. An apparatus for decoding a block of texture data that encodes a set of texture data elements to be used for graphics processing, comprising:
   a processor configured to determine the data value to be used for at least one texture element that the texture data block encodes by interpolating the data value for that texture element based on the position of the texture element along a path that covers a number of the texture elements that the texture data block encodes.

34. The apparatus of claim 33, comprising a processor for determining from the texture data block data indicating the end point data values for the path or paths over which data values for the texture elements are to be interpolated.

35. The apparatus of claim 33, comprising a processor for determining from the texture data block, data indicating the interpolation scheme to be used along the path or paths over which data values for the texture elements are to be interpolated.

36. The apparatus of claim 33, comprising a processor for determining from the texture data block the end points of the interpolation path or paths and the path or paths to be followed between those end points.

37. The apparatus of claim 33, wherein there is a predefined set or sets of interpolation paths for application to the texture data elements of a texture data block, and the apparatus comprises a processor for determining from the texture data block which set of interpolation paths is to be applied to the texture data elements of the texture data block.

38. The apparatus of claim 33, wherein the texture data block represents plural different sub-sets of texture data elements that are to be reproduced independently of each other, and the apparatus comprises a processor for determining from the texture data block, data indicating interpolation paths to be applied to each sub-set of texture elements.

39. A graphics processor comprising the apparatus of claim 33.

40. A computer program product comprising computer software code embodied in a non-transitory computer-readable medium for performing the method of claim 15 when the software code is run on a computer.

* * * * *